(12) United States Patent
Tsubaki

(10) Patent No.: US 10,358,163 B2
(45) Date of Patent: Jul. 23, 2019

(54) ELECTRIC POWER STEERING APPARATUS

(71) Applicant: NSK LTD., Tokyo (JP)

(72) Inventor: Takahiro Tsubaki, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/778,268

(22) PCT Filed: Feb. 27, 2017

(86) PCT No.: PCT/JP2017/007487
§ 371 (c)(1),
(2) Date: May 23, 2018

(87) PCT Pub. No.: WO2017/150445
PCT Pub. Date: Sep. 8, 2017

(65) Prior Publication Data
US 2019/0002019 A1     Jan. 3, 2019

(30) Foreign Application Priority Data

Apr. 6, 2016    (JP) .................................. 2016-076895

(51) Int. Cl.
*B62D 6/00*     (2006.01)
*B62D 5/04*     (2006.01)

(52) U.S. Cl.
CPC .............. *B62D 6/003* (2013.01); *B62D 5/04* (2013.01); *B62D 5/0463* (2013.01); *B62D 5/0472* (2013.01); *B62D 6/00* (2013.01)

(58) Field of Classification Search
CPC ..... B62D 6/003; B62D 5/0463; B62D 5/0472
(Continued)

(56) References Cited

U.S. PATENT DOCUMENTS

| | | | |
|---|---|---|---|
| 7,233,850 B2 * | 6/2007 | Nakano | B60C 23/00 180/234 |
| 8,204,647 B2 * | 6/2012 | Nakane | B62D 5/0484 180/402 |

(Continued)

FOREIGN PATENT DOCUMENTS

| | | | |
|---|---|---|---|
| EP | 2159132 A2 * | 3/2010 | ............. B62D 5/046 |
| JP | 2839742 B2 * | 12/1998 | |

(Continued)

OTHER PUBLICATIONS

International Search Report of PCT/JP2017/007487 filed Apr. 18, 2017.

(Continued)

*Primary Examiner* — Tuan C To
(74) *Attorney, Agent, or Firm* — Sughrue Mion, PLLC

(57) ABSTRACT

An electric power steering apparatus that has a function to switch an assist mode and an automatic mode, and comprises a handle vibration removing section to cut off frequency components near a predetermined central frequency with reference to a target steering angle, a position control section to output a motor angular velocity command value, an integration section to integrate a deviation between the motor angular velocity command value and a motor angular velocity, a proportion section to input the motor angular velocity, and a velocity control section to output the motor current command value by subtracting an output of the proportion section from an output of the integration section, thereby to remove the vibration being caused by spring characteristics of a torsion bar and inertia moment of a steering wheel in the automatic mode.

8 Claims, 22 Drawing Sheets

(58) Field of Classification Search
USPC .......................................................... 701/41
See application file for complete search history.

(56) References Cited

U.S. PATENT DOCUMENTS

| | | | | |
|---|---|---|---|---|
| 8,634,986 B2* | 1/2014 | Ghoneim | ............... | B62D 6/008 |
| | | | | 701/32.9 |
| 9,751,556 B1* | 9/2017 | Lin | ............... | B62D 5/0481 |
| 2009/0024278 A1* | 1/2009 | Kondo | ............... | B62D 1/28 |
| | | | | 701/41 |
| 2009/0259367 A1* | 10/2009 | Choi | ............... | B62D 5/0463 |
| | | | | 701/42 |
| 2012/0164618 A1* | 6/2012 | Kullok | ............... | G09B 5/00 |
| | | | | 434/323 |
| 2012/0191301 A1* | 7/2012 | Benyo | ............... | B62D 5/0463 |
| | | | | 701/41 |
| 2012/0212353 A1* | 8/2012 | Fung | ............... | B60K 28/06 |
| | | | | 340/905 |
| 2014/0149000 A1 | 5/2014 | Tamura et al. | | |
| 2015/0191200 A1 | 7/2015 | Tsubaki et al. | | |
| 2015/0225017 A1* | 8/2015 | Takeda | ............... | B62D 6/008 |
| | | | | 701/41 |
| 2015/0232120 A1* | 8/2015 | Aono | ............... | B62D 5/0463 |
| | | | | 701/42 |
| 2015/0232124 A1* | 8/2015 | Takeda | ............... | B62D 15/025 |
| | | | | 701/42 |
| 2015/0291210 A1* | 10/2015 | Kageyama | ............... | B60T 8/1755 |
| | | | | 701/41 |
| 2016/0200324 A1* | 7/2016 | Suzuki | ............... | B60L 3/0076 |
| | | | | 701/22 |
| 2016/0221468 A1* | 8/2016 | Suzuki | ............... | B60L 15/20 |
| 2016/0280254 A1* | 9/2016 | Shimizu | ............... | B62D 5/04 |
| 2016/0304119 A1* | 10/2016 | Sugawara | ............... | H02P 21/05 |
| 2017/0057512 A1* | 3/2017 | Woodley | ............... | B60W 10/06 |
| 2017/0096166 A1* | 4/2017 | Kataoka | ............... | B62D 5/008 |
| 2017/0204589 A1* | 7/2017 | Ohira | ............... | E02F 9/123 |
| 2017/0274929 A1* | 9/2017 | Sasaki | ............... | B62D 5/04 |
| 2018/0022377 A1* | 1/2018 | Tsubaki | ............... | B62D 6/10 |
| | | | | 701/42 |
| 2018/0022381 A1* | 1/2018 | Matsumura | ............... | B62D 5/14 |
| | | | | 180/419 |
| 2018/0127022 A1* | 5/2018 | Bakos | ............... | B62D 5/046 |

FOREIGN PATENT DOCUMENTS

| | | | | |
|---|---|---|---|---|
| JP | 3190525 B2 * | 7/2001 | | |
| JP | 2003-341543 A | 12/2003 | | |
| JP | 2007-008422 A | 1/2007 | | |
| JP | 2010-221799 A | 10/2010 | | |
| JP | 2013-252729 A | 12/2013 | | |
| JP | 2014-054885 A | 3/2014 | | |
| JP | 2014-122017 A | 7/2014 | | |
| JP | 6281751 B2 * | 2/2018 | | |
| JP | 6391096 B2 * | 9/2018 | | |
| WO | WO-2013058090 A1 * | 4/2013 | ......... | H02P 21/0017 |
| WO | WO-2014034291 A1 * | 3/2014 | ......... | H02P 21/0003 |
| WO | 2014/136515 A1 | 9/2014 | | |

OTHER PUBLICATIONS

International Preliminary Report on Patentability of PCT/JP2017/007487 filed Jan. 11, 2018.

* cited by examiner

PRIOR ART

PRIOR ART

PRIOR ART

ELECTRIC POWER STEERING APPARATUS

This application is a National Stage of International Application No. PCT/JP2017/007487 filed Feb. 27, 2017, claiming priority based on Japanese Patent Applications No. 2016-038052 filed Feb. 29, 2016, 2016-038053 filed Feb. 29, 2016, and 2016-076895 filed Apr. 6, 2016.

TECHNICAL FIELD

The present invention relates to an electric power steering apparatus that has an assist mode which controls a motor applying an assist torque to a steering system of a vehicle when a driver steers the steering system and an automatic mode which controls the motor depending on a target steering angle supplied from the vehicle as needed when the vehicle autonomously runs, and that is capable of removing a vibration due to a response characteristic by using an integral-proportional control (an I-P control) (a proportional preceding type PI-control) and further removing a vibration (a vibration due to a spring inertia system) due to a spring characteristic of a torsion bar and an inertia moment of a handle (a steering wheel) during the automatic mode by using a rate limiter and a filter (a handle vibration removing section).

BACKGROUND ART

As a conventional art, a general configuration of the conventional electric power steering apparatus will be described with reference to FIG. 1. As shown in FIG. 1, a column shaft (a steering shaft) 2 connected to a steering wheel 1 is connected to steered wheels 8L and 8R through reduction gears 3, universal joints 4a and 4b, a pinion-and-rack mechanism 5, and tie rods 6a and 6b, further via hub units 7a and 7b. In addition, the column shaft 2 is provided with a torque sensor 10 for detecting a steering torque Tr of the steering wheel 1 and a steering angle sensor 14 for detecting a steering angle θh of the steering wheel 1, and a motor 20 for assisting a steering torque of the steering wheel 1 is connected to the column shaft 2 through the reduction gears 3. The electric power is supplied to a control unit (ECU) 100 for controlling the electric power steering apparatus from a battery 13, and an ignition key signal is inputted into the control unit 100 through an ignition key 11. The control unit 100 calculates a steering assist command value of an assist (steering assist) command on the basis of the steering torque Tr detected by the torque sensor 10 and a vehicle speed Vs detected by a vehicle speed sensor 12, and controls a current supplied to the motor 20 by means of a voltage control value E obtained by performing compensation or the like to the steering assist command value. As well, a steering angle sensor 14 is not indispensable and may not be provided. It is possible to obtain the steering angle θ from a rotational position sensor such as a resolver which is connected to the motor 20.

The controller area network (CAN) 50 to send/receive various information and signals on the vehicle is connected to the control unit 100, and it is also possible to receive the vehicle speed Vs from the CAN 50. Further, a Non-CAN 51 is also possible to connect to the control unit 100, and the Non-CAN 51 sends and receives a communication, analogue/digital signals, electric wave or the like except for the CAN 50.

In the electric power steering apparatus having a torsion bar to the column shaft (the handle shaft) 2, for example, as shown in FIG. 2, various sensors are mounted on the column shaft between which the torsion bar 23 is interposed, and various angles are detected. That is, a Hall IC sensor 21 as an angle sensor and a 20° rotor sensor 22 of a torque sensor input-side rotor are mounted on an input shaft 2A of the steering wheel 1 side of the handle shaft 2. The Hall IC sensor 21 outputs an AS_IS angle θn of 296° period. The 20° rotor sensor 22 that is mounted to the steering shaft 1 side closer than the torsion bar 23 outputs a column input-side angle signal $\theta_{h1}$ of 20° period, and the column input-side angle signal $\theta_{h1}$ is inputted into a steering angle calculating section 50. A 40° rotor sensor 24 of a torque sensor output-side rotor is mounted on an output shaft 2B of the handle shaft 2, a column output-side angle signal $\theta_{c1}$ from the 40° rotor sensor 24 is outputted, and the column output-side angle signal $\theta_{c1}$ is inputted into the steering angle calculating section 50. The column input-side angle signal $\theta_{h1}$ and the column output side angle signal $\theta_{c1}$ are calculated with an absolute angle at the steering angle calculating section 50, a handle angle θh and a column angle θc with the absolute angle are outputted from the steering angle calculating section 50. A mechanism diagram that shows a relationship among a torsion bar torsional angle Δθ, the handle angle θh and the column angle θc is shown in FIG. 3.

As another prior art, it is known that the power steering apparatus, which has a parking assist apparatus which easily assists a double parking or a parallel parking, steering-controls by performing a velocity proportional-integrational control (a velocity PI-control) to a deviation between a target steering angle and a steering angle. The above technique is disclosed in, for example, Japanese Unexamined Patent Publication No. 2003-341543 (Patent Document 1).

In the electric power steering apparatus of the vehicle having the automatic mode (a parking assist function) and the assist mode, it is known that a steering angle control section including a position control system that a velocity control loop system is a minor loop, and comprises a rate limiter which smooths the target steering angle and is constituted by a first-order or second-order low pass filter (LPF). This technique is disclosed in, for example, Japanese Unexamined Patent Publication No. 2013-252729 A (Patent Document 2) and Japanese Unexamined Patent Publication No. 2014-054885 A (Patent Document 3).

THE LIST OF PRIOR ART DOCUMENTS

Patent Documents

Patent Document 1: Japanese Unexamined Patent Publication No. 2003-341543 A
Patent Document 2: Japanese Unexamined Patent Publication No. 2013-252729 A
Patent Document 3: Japanese Unexamined Patent Publication No. 2014-054885 A

SUMMARY OF THE INVENTION

Problems to be Solved by the Invention

In the electric power steering apparatus described in Patent Document 1, in a case that the vehicle performing the steering angle following-up control by using the velocity PI-control performs the steering angle control, a response of the actual steering angle changes due to variations of the running vehicle speed, the friction and road surface reaction force. Thus, there are problems that the following-up to the target steering angle is insufficient, and the driver feels uncomfortable due to the handle vibration that is occurred by not considering the spring inertia system of the handle.

In the electric power steering apparatuses described in Patent Documents 2 and 3, since the electric power steering apparatuses includes the rate limiter, the smooth steering can be realized even when the target steering angle is abrupt steering, and an excellent response is exerted in the low vehicle speed. However, since a design to the resonance frequency of the spring inertia system of the handle is not considered, it is difficult to remove the handle vibration.

The present invention has been developed in view of the above-described circumstances, and an object of the present invention is to provide the electric power steering apparatus that removes the vibration due to the response characteristics by using the I-P control (the proportional preceding type PI-control), and the vibration due to the spring characteristics of the torsion bar and the inertia moment of the handle (the vibration being caused by the spring inertia system) in the automatic mode by using the rate limiter and the filter (the handle vibration removing section).

Means for Solving the Problems

The present invention relates to an electric power steering apparatus that has an assist mode which controls a motor applying an assist torque to a steering system of a vehicle when steering the steering system and an automatic mode which controls the motor depending on a target steering angle supplied from the vehicle as needed when the vehicle autonomously runs, the above-described object of the present invention is achieved by that comprising: a torque control section to calculate a first motor current command value based on a vehicle speed of the vehicle and a steering torque inputted into a steering shaft of the steering system, and a steering angle control section to calculate a second motor current command value based on the target steering angle, an actual steering angle and a motor angular velocity of the motor, wherein the steering angle control section that has a configuration to output the first motor current command value in the assist mode and to output the second motor current command value in the automatic mode comprises a rate limiter that the output value is coincident with the target steering value by changing an output value in a step form with reference to the target steering angle in a predetermined period, a handle vibration removing section to input an output of the rate limiter, and to cut off frequency components near a predetermined central frequency and output, a position control section to input a difference between the actual steering angle and an output value of the handle vibration removing section, and to output a motor angular velocity command value, and a velocity control section that comprises an integration section to integrate a deviation between the motor angular velocity command value and the motor angular velocity, and a proportion section to input the motor angular velocity, and outputs the second motor current command value by subtracting an output of the proportion section from an output of the integration section.

Or, the above-described object of the present invention is achieved by that comprising: a torque control section to calculate a first motor current command value based on a vehicle speed of the vehicle and a steering torque inputted into a steering shaft of the steering system, and a steering angle control section to calculate a second motor current command value based on the target steering angle, an actual steering angle, a motor angular velocity of the motor and a torsion bar torque, wherein the steering angle control section that has a configuration to output the first motor current command value in the assist mode and to output the second motor current command value in the automatic mode, comprises: a rate limiter that the output value is coincident with the target steering value by changing an output value in a step form with reference to the target steering angle in a predetermined period, a handle vibration removing section to input an output of the rate limiter, and to cut off frequency components near a predetermined central frequency and output, a position control section to input a difference between the actual steering angle and an output value of the handle vibration removing section, and to output a motor angular velocity command value, a velocity control section that comprises an integration section to integrate a deviation between the motor angular velocity command value and the motor angular velocity, and a proportion section to inputs the motor angular velocity, and outputs a subtracted value by subtracting an output of the proportion section from an output of the integration section, and a handle damping section to input a signal of the torsion bar torque and to pass the signal whose frequency having a predetermined cut-off frequency or more, wherein the steering angle control section adds an output of the handle damping section to an output of the velocity control section, and outputs as the second motor current command value.

Further, the present invention relates to an electric power steering apparatus that has an assist mode which controls a motor applying an assist torque to a steering system of a vehicle when steering the steering system and an automatic mode which controls the motor depending on a target steering angle supplied from the vehicle as needed when the vehicle autonomously runs, the above-described object of the present invention is achieved by that comprising: a torque control section to calculate a first motor current command value based on a vehicle speed of the vehicle and a steering torque inputted into a steering shaft of the steering system, a steering angle control section to calculate a second motor current command value based on the target steering angle, an actual steering angle and a motor angular velocity of the motor, and a vehicle motion control section to calculate the target steering angle based on vehicle information, wherein the vehicle motion control section comprises: a rate limiter that the output value is coincident with the lateral position command by changing an output value in a step form with reference to a lateral position command in a predetermined period, a lateral position command vibration removing section to remove vibration frequency components of an output of the rate limiter, a lateral velocity calculating section to calculate a lateral velocity based on a lateral position, a lateral position control section to input a difference between the lateral position and an output value of the lateral position command vibration removing section, and to output a lateral velocity command value, a lateral velocity control section that comprises an integration section to integrate a deviation between the lateral velocity command value and the lateral velocity, and a proportion section to input the lateral velocity, and outputs a subtracted value by subtracting an output of the proportion section from an output of the integration section, and a vehicle behavior stabilizing section to input a yaw rate signal and to pass the yaw rate signal whose frequency having a predetermined cut-off frequency or more, wherein the vehicle motion control section adds an output of the vehicle behavior stabilizing section to an output of the lateral velocity control section, and sets as the target steering angle.

Effects of the Invention

According to the electric power steering apparatus of the present invention, it is possible to remove the vibration due to the response characteristics by using the I-P control (a proportional preceding type PI-control), and the vibration due to the spring characteristics of the torsion bar and the inertia moment of the handle (the vibration being caused by the spring inertia system) by using the rate limiter and the filter (the handle vibration removing section).

Further, a control band of the actual angle to the target steering angle is spread to a high frequency side by using a motor velocity command feed-forward (FF) filter. Thereby, the response of the steering angle control can be improved. By providing the lateral position command vibration removing section, in a case that the vibration phenomena due to the resonance characteristics (the yaw resonance and the like), which the vehicle has, occurs when controlling the vehicle, the vibration frequency components included in the lateral position command yref after passing the rate limiter, can be reduced. By using the vehicle behavior stabilizing means based on the yaw rate signal γ [rad/s] of the vehicle, the damping effect against the vibration phenomena of the vehicle can be improved.

MODE FOR CARRYING OUT THE INVENTION

The present invention relates to an electric power steering apparatus that has an assist mode which controls a motor applying an assist torque to a steering system of a vehicle when a driver steers the steering system and an automatic mode which controls the motor depending on a target steering angle supplied from the vehicle as needed when the vehicle autonomously runs, and removes a vibration due to response characteristics by using an I-P control (a proportional preceding type PI-control), and the vibration due to spring characteristics of a torsion bar and an inertia moment of a handle (a steering wheel) (vibration being caused by a spring inertia system) by using a rate limiter and a filter (a handle vibration removing section).

Embodiments of the present invention will be described with reference to drawings in detail.

At first, the power steering apparatus of the present invention has two operation modes (the assist mode and the automatic mode). That is, the two operation modes are the assist mode which controls the motor applying the assist torque to the steering system of the vehicle when the driver steers the steering system and the automatic mode which controls the motor depending on the target steering angle supplied from the vehicle as needed when the vehicle autonomously runs. In the vehicle provided the electric power steering apparatus having the automatic mode and the assist mode, if the spring inertia system of the handle is not considered, it is difficult to suppress the vibration of the handle.

Figure 1:
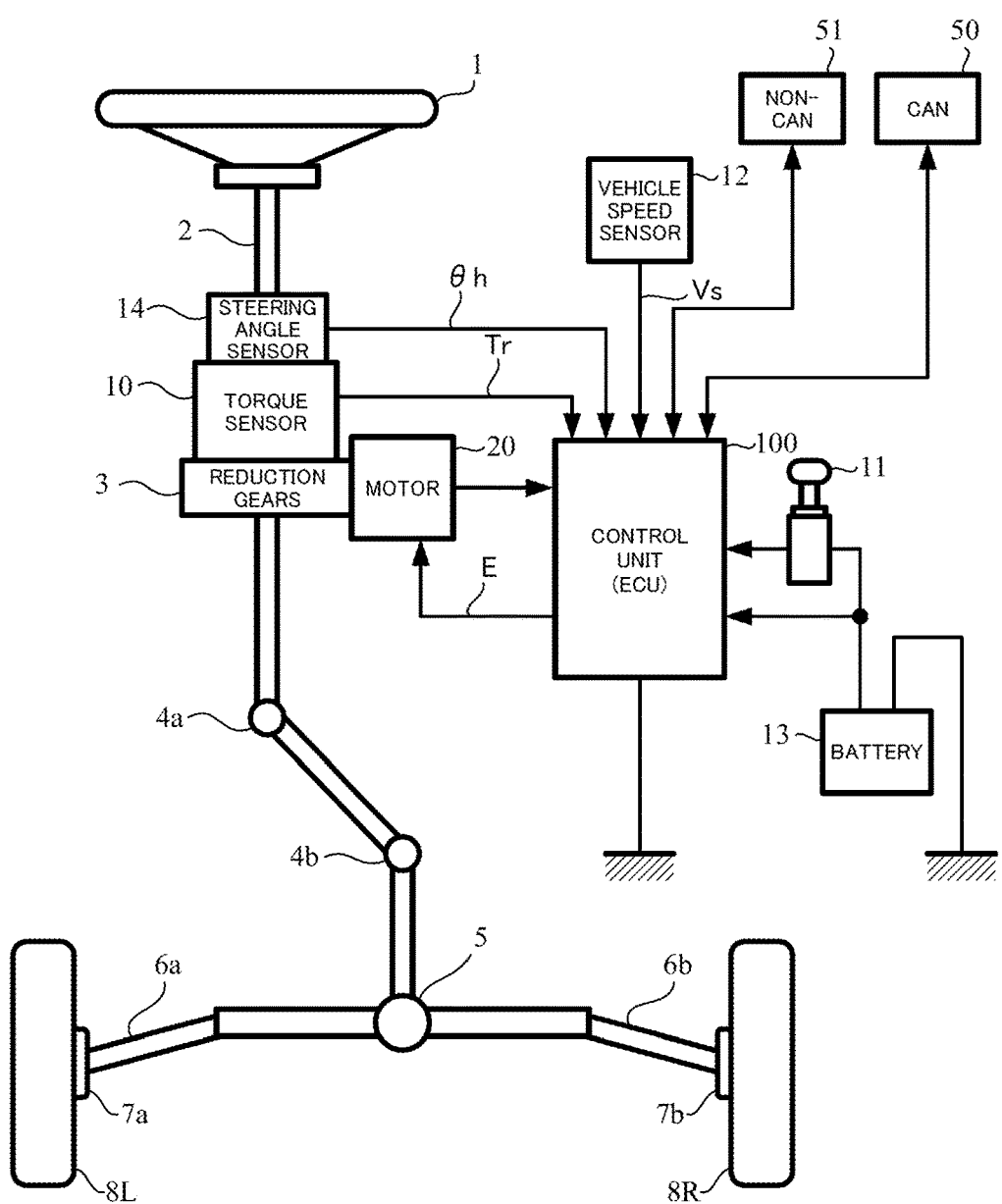
FIG. 1 is a configuration diagram showing a general outline of an electric power steering apparatus.
Figure 2:
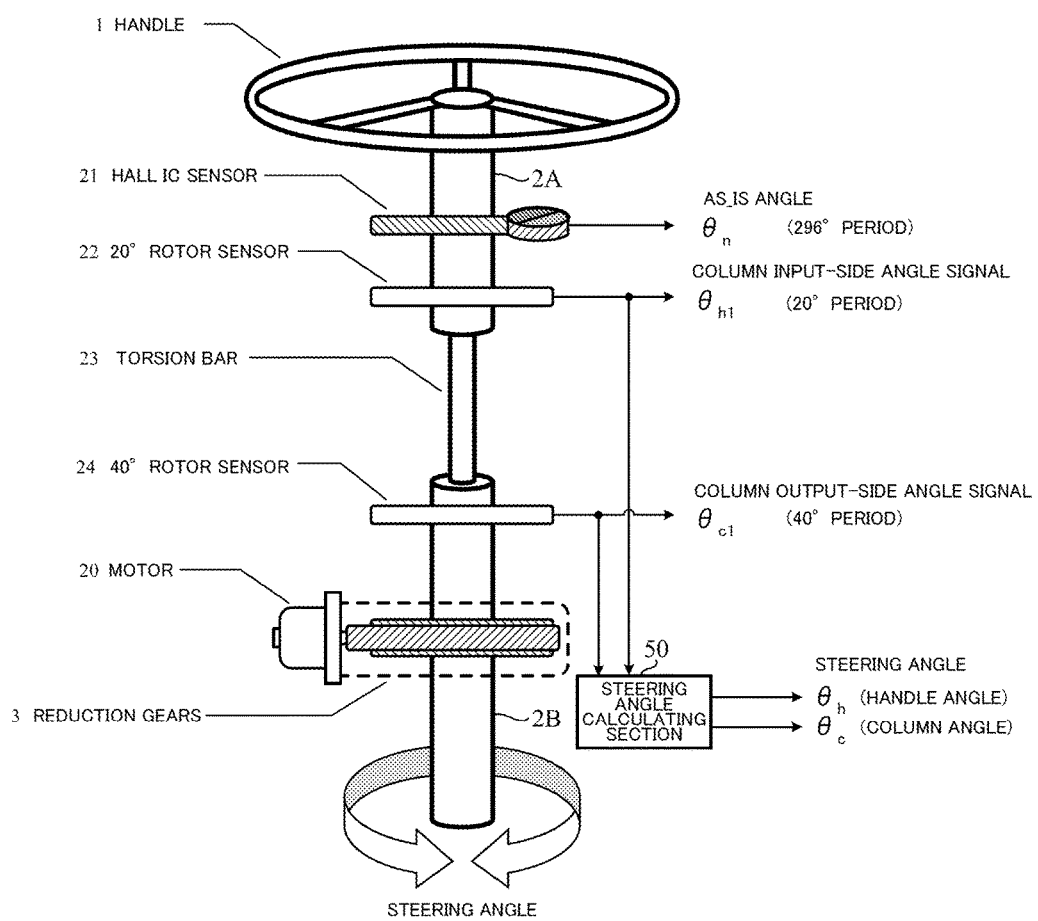
FIG. 2 is a diagram showing a mounting example of sensors and a relationship between a column angle and a handle angle.
Figure 3:
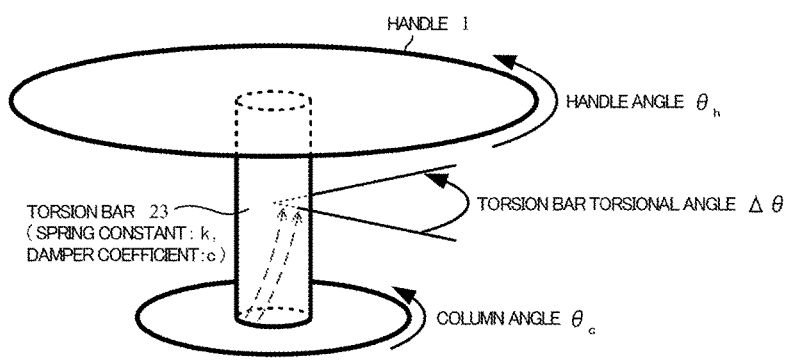
FIG. 3 is a mechanism diagram showing a relationship among a torsion bar, the handle angle and the column angle.
Figure 4:
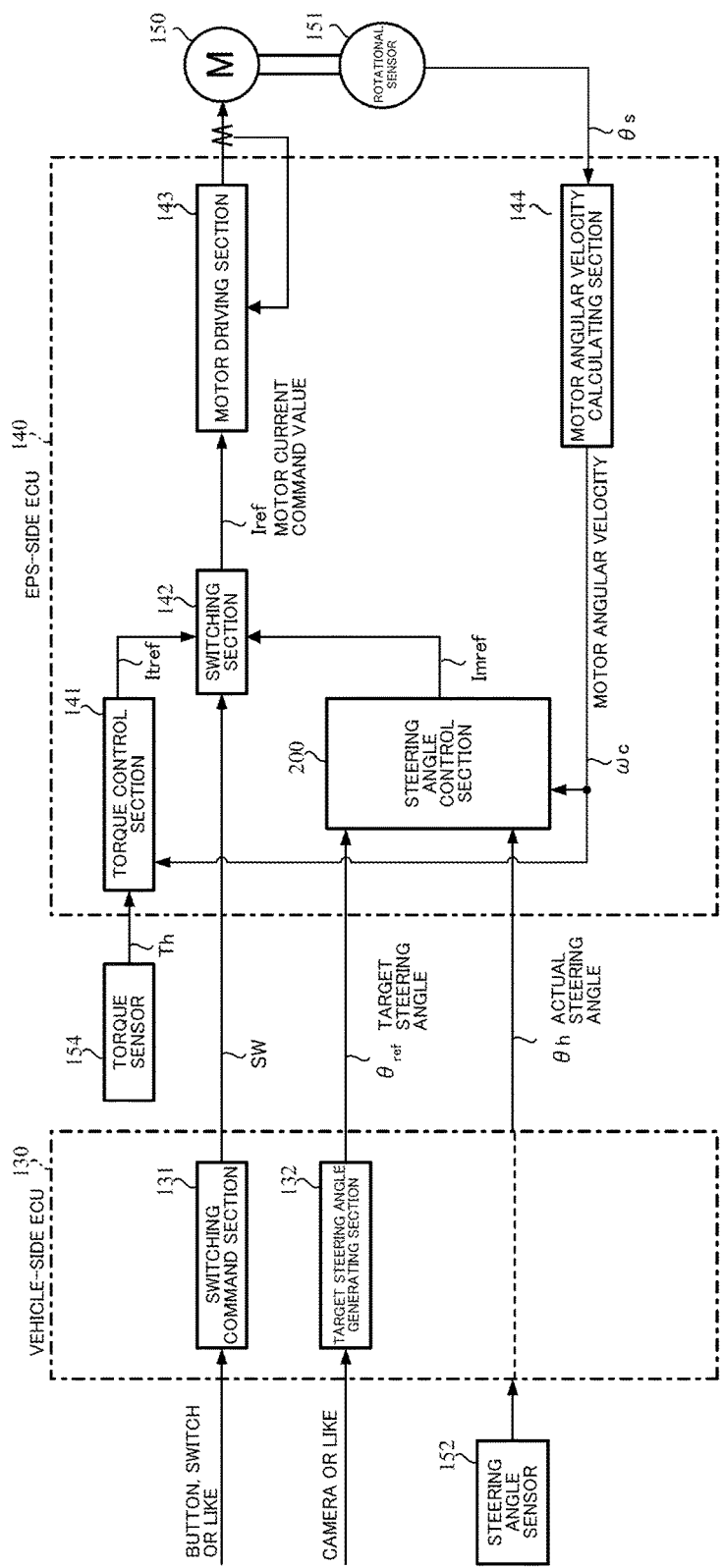
FIG. 4 is a block diagram showing a configuration example of a control system of the electric power steering apparatus in the first embodiment of the present invention.

FIG. 4 shows a configuration example in the first embodiment of the present invention, and a rotational sensor 151 such as a resolver for detecting a motor rotational angle es is connected to the motor 150. The motor 150 is drivingcontrolled via a vehicle-side ECU 130 and an EPS (an electric power steering apparatus)-side ECU 140.

The vehicle-side ECU 130 comprises a switching command section 131 to output a switching command SW of the automatic mode or the assist mode based on a button, a switch or the like by which an intention of the driver is indicated, and a target steering angle generating section 132 to generate a target steering angle $\theta_{ref}$ based on a signal from a camera (an image), a distance sensor, or the like. An actual steering angle $\theta h$ detected by a steering angle sensor 152 that is disposed on a column shaft is inputted into a steering angle control section 200 in the EPS-side ECU 140 via the vehicle-side ECU 130.

The switching command section 131 outputs the switching command SW based on an identifying signal that indicates entering to the automatic mode and informs the intension of driver by using the button or the switch which is disposed on a dashboard or around a handle, or a signal of the vehicle state such as a parking mode from a shift lever, and inputs the switching command SW into the switching section 142 in the EPS-side ECU 140. The target steering angle generating section 132 generates the target steering angle $\theta_{ref}$ based on data from the camera (the image), the distance sensor, or the like by using a known method, and input the generated target steering angle $\theta_{ref}$ into the steering angle control section 200 in the EPS-side ECU 140.

The EPS-side ECU 140 comprises a torque control section 141 to output a motor current command value Itref calculated based on a steering torque Th and a motor angular velocity $\omega c$, the steering angle control section 200 to calculate and output a motor current command value Imref for steering angle automatic control based on the target steering angle $\theta_{ref}$, the actual steering angle $\theta h$, and the motor angular velocity $\omega c$, the switching section 142 to switch the motor current command value Itref or Imref with the switching command SW, a motor driving section 143 to driving-control the motor 150 based on the motor current command value Itref or Imref from the switching section 142, and a motor angular velocity calculating section 144 to calculate the motor angular velocity $\omega c$ based on a motor rotational angle $\theta s$ from a rotational sensor 151. The switching section 142 switches the assist mode by the torque control section 141 or the automatic mode by the steering angle control section 200 based on the switching command SW from the switching command section 131, and outputs the motor current command value Itref in the assist mode and the motor current command value Imref in the automatic mode. Further, the motor driving section 143 comprises a proportional-integral(PI) current control section (not shown), a pulse width modulation (PWM) control section (not shown), an inverter (not shown) and so on.

Figure 5:
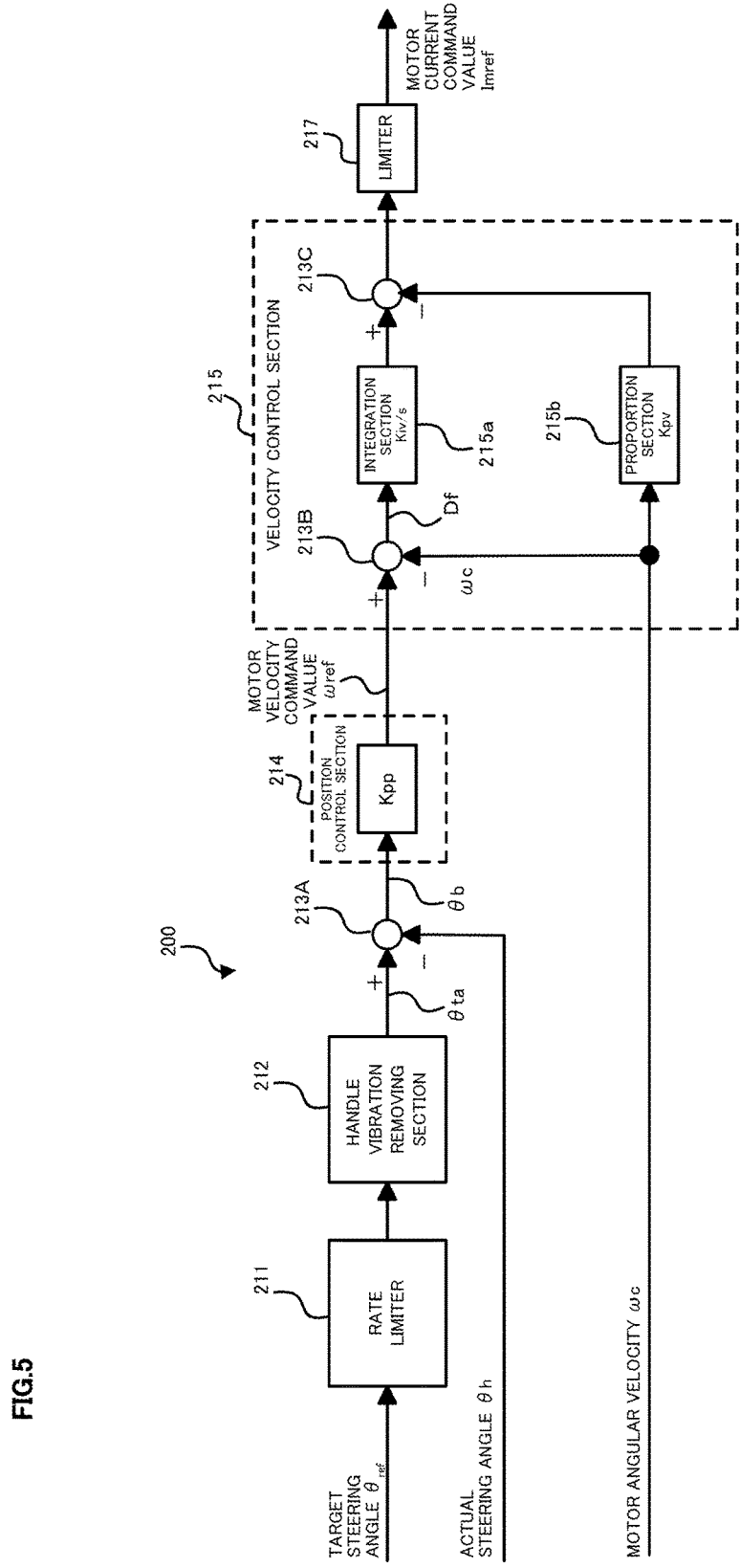
FIG. 5 is a block diagram showing a configuration example in the first embodiment of the present invention.

The steering angle control section 200 has a configuration as shown in FIG. 5, and forms a position control system that a velocity control loop system is a minor loop. The target steering angle $\theta_{ref}$ is inputted into a rate limiter 211 so that the target steering angle $\theta_{ref}$ is smoothed, that is, the target steering angle $\theta_{ref}$ is smoothly changed within a range of a predetermined time changing rate in a case that the target steering angle $\theta_{ref}$ is suddenly changed. The target steering angle $\theta ta$ passing through a handle vibration removing section 212 that removes the vibration due to spring characteristics of the torsion bar and the inertia moment of the handle (the vibration being caused by the spring inertia system) is addition-inputted into a subtracting section 213A.

Then, the actual steering angle $\theta h$ is subtracting-inputted into the subtracting section 213A, an angle deviation $\theta b$ between the smoothed target steering angle $\theta ta$ and the actual steering angle $\theta h$ is multiplied by a gain $K_{pp}$ at a position control section ($K_{pp}$) 214, and the multiplied value is adding-inputted into a subtracting section 213B as a motor velocity command value $\omega ref$. The motor angular velocity $\omega c$ from the motor angular velocity calculating section 144 is subtracting-inputted into the subtracting section 213B, a velocity deviation Df calculated at the subtracting section 213B is inputted into an addition-inputted into a subtracting section 213C via an integration section (a gain $K_{iv}$) 215a, and the motor angular velocity $\omega c$ is multiplied by a gain $K_{pv}$ at a proportion section 215b and the multiplied value is subtraction-inputted into the subtracting section 213C. The subtracted result at the subtracting section 213C is inputted into a limiter 217. The current command value Imref that is limited by an upper limit value and a lower limit value which are set independently at the limiter 217 is outputted from the limiter 217 to the switching section 142.

As well, the position control section 214 and the velocity control section 215 constitute a current command value calculating section.

The feature of the first embodiment of the present invention resides in that the steering angle control section 200 in the EPS-side ECU 140 comprises the rate limiter to the target steering angle and the handle vibration removing section 212 to remove the vibration components being caused by the spring inertia system. Thereby, the vibration due to the spring characteristics of the torsion bar and the inertia moment of the handle (the vibration being caused by the spring inertia system) can be removed. By being provided with the rate limiter 211, even when the target steering angle is suddenly changed, an effect that the response of the handle steering angle is smoothed is obtained. Since the vehicle can be accurately moved in accordance with the target steering angle regardless of the vehicle speed, the safety to the driver can be further improved.

Figure 6:
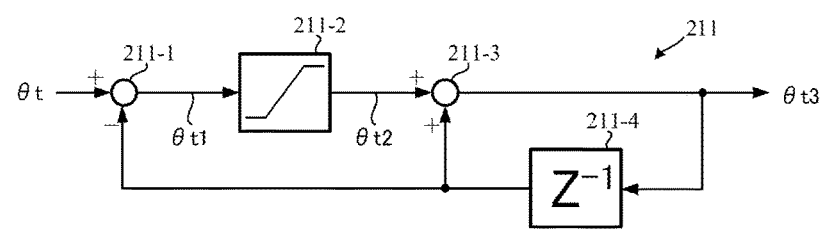
FIG. 6 is a block diagram showing an example of a rate limiter that is used in the present invention.
Figure 7:
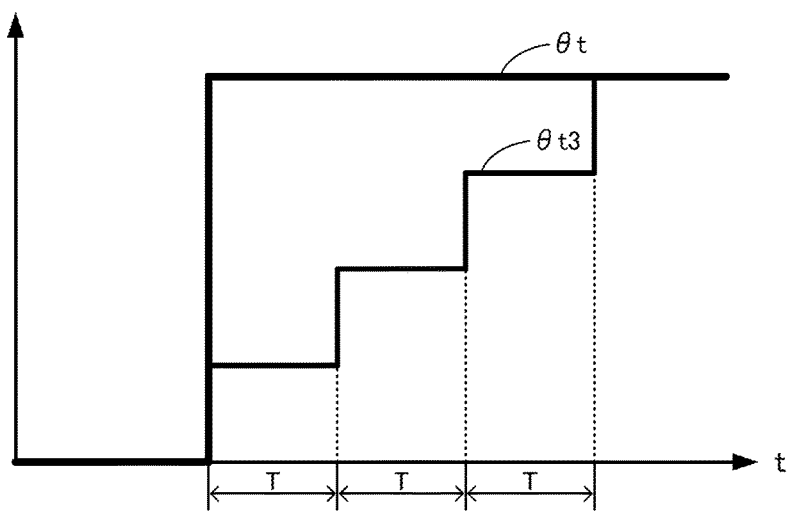
FIG. 7 is a diagram showing a configuration example of a changing amount setting section of the present invention.

The rate limiter 211 smooths the target steering angle $\theta t$ in a case that the target steering angle $\theta t$ is suddenly changed, and outputs the smoothed target steering angle as shown in FIG. 6. That is, the target steering angle $\theta t$ is addition-inputted into a subtracting section 211-1, and a steering angle $\theta t1$ being a subtracted result by subtracting a previous value from the target steering angle $\theta t$ is inputted into a changing amount setting section 211-2 and a limited value thereof is outputted as a changing amount $\theta t2$. The changing amount setting section 211-2 sets a difference $\theta t1$ between the previous value from a holding section ($Z^{-1}$) 211-4 and the input ($\theta t$), and the changing amount $\theta t2$ from the changing amount setting section 211-2 is added to the previous value at an adding section 211-3 and the added result is outputted as the new target steering angle $\theta t3$. The changing amount setting section 211-2 sets the changing amount so that the changing amount is not out of ranges of an upper limit value and a lower limit value. The characteristics of the changing amount setting section 211-2 is describes as follows. The difference between the previous value and the input (the target steering angle) $\theta t$ is calculated in every calculating period T. In a case that the difference is out of ranges of the upper limit value and the lower limit value of the changing amount setting section 211-2, by repeating to add the difference to the previous value, the output $\theta t3$ changes in a step form, as shown in FIG. 7, and finally the output $\theta t3$ is coincident with the target steering angle $\theta t$. Alternatively, in a case that the difference is within a range between the upper limit value and the lower limit value, the changing amount $\theta t2$ that is equal to the difference $\theta t1$ is outputted. Since the above changing amount $\theta t2$ is added to the previous value, the result output $\theta t3$ is coincident with the input (the target steering angle) θt. As a result, even if the target steering angle θt is suddenly changed, the rate limiter 211 can smooth the target steering angle θt, prevents from the suddenly current changing, and therefore has a function that an uneasy feeling of the automatic driving to the driver is reduced.

Next, frequency characteristics of the handle vibration removing section 212 will be described.

At first, it is known that the handle vibration frequency due to the spring characteristics of the torsion bar and the inertia moment of the handle is about 12.5 [Hz]. Since the handle vibration removing section 212 operates a reduction of the gain near the handle vibration frequency, that is, "12.5±5.0 [Hz]", a notch filter is suitable for the purpose. The notch filter that is used in the present embodiment can be express as, for example, a transfer function of a second-order filter such as an Expression 1.

$$G_{notch} = \frac{\omega_d^2}{\omega_n^2} \frac{s^2 + 2\zeta_n \omega_n s + \omega_n^2}{s^2 + 2\zeta_d \omega_d s + \omega_d^2} \quad \text{[Expression 1]}$$

Figure 8:
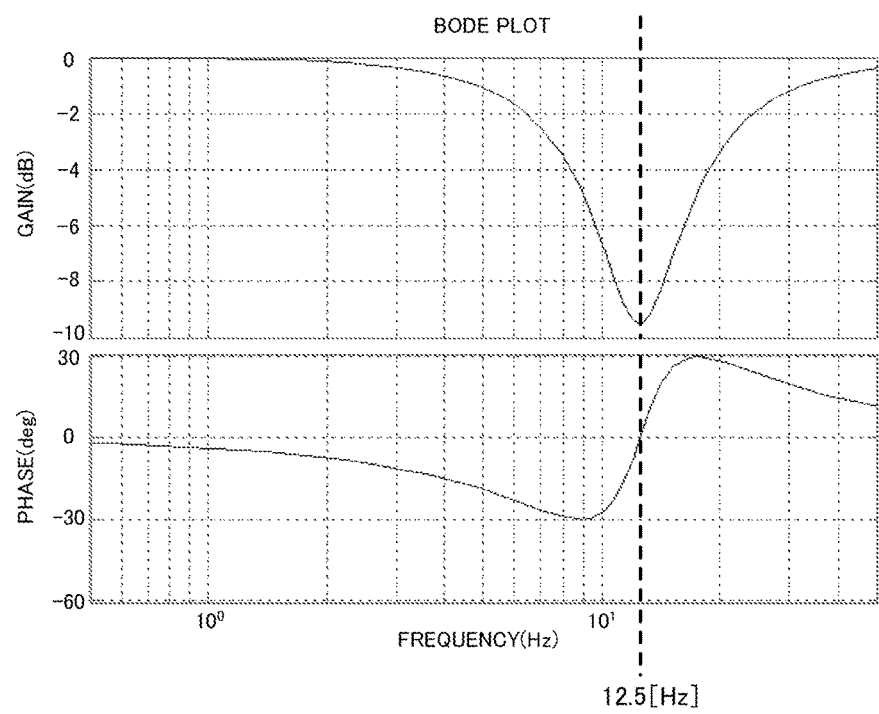
FIG. 8 is a characteristic diagram showing frequency characteristics of a gain and a phase of a handle vibration removing section of the present invention.

In respective constants of the Expression 1, in a case that central frequencies "ωn=ωd=2π×12.5 [rad/s]", attenuation constants "ζn=0.2" and "ζd=0.6", a Bode plot is shown in FIG. 8. As shown in FIG. 8, it is understood that the gain is reduced as the central frequency about 12.5 [Hz] in the frequency characteristics of the handle vibration removing section 212. The central frequency is set based on the handle vibration frequency due to the spring characteristics of the torsion bar and the inertia moment of the handle. For example, it is set in a range of 12.5±5 [Hz]. Further, the central frequency ωn may not be coincident with the central frequency ωd, and the central frequency ωn and the central frequency ωd may be within a range of "2π×7.5 [rad/s]" to "2π×17.5 [rad/s]".

Next, with reference to a system from the column to a tire, a model by using the transfer function as an integrated inertia system (a column inertia) is indicated. In order to model the column inertia system, following physical quantity symbols are used.

Jc: column inertia [kg·m²]
Dc: column attenuation coefficient [N·m/(rad/s)]
Jh: handle inertia [kg·m²]
Dh: handle attenuation coefficient [N·m/(rad/s)]
Ks: torsion bar spring constant [N·m/rad]
Ds: torsion bar attenuation coefficient [N·m/(rad/s)]
Kt: motor torque constant [N·m/A]

The motor generating torque is converted into the torque of the column shaft (considering the reduction mechanism). Since it is treated that the actual motor current is coincident with the current command value $I_{ref}$, the current control is omitted.

θ$_{ref}$: target steering angle [rad]
θh: handle steering angle [rad]
θc: column angle [rad]
ωc: column angle velocity [rad/s]

As well, the column angle velocity ωc is calculated as follows. The motor rotational angle is differential-calculated in the ECU, and is converted into the motor rotational velocity. Further, the column shaft converting is performed to the motor rotational velocity, and then the column angle velocity ωc is calculated. Actually, in order to remove the noise in a high frequency band, a low pass filter (LPF) is used (not shown).

Tt: torsion bar torque [N·m]
$I_{ref}$: current command value [A]
ωref: target angle velocity [rad/s]

Figure 9:
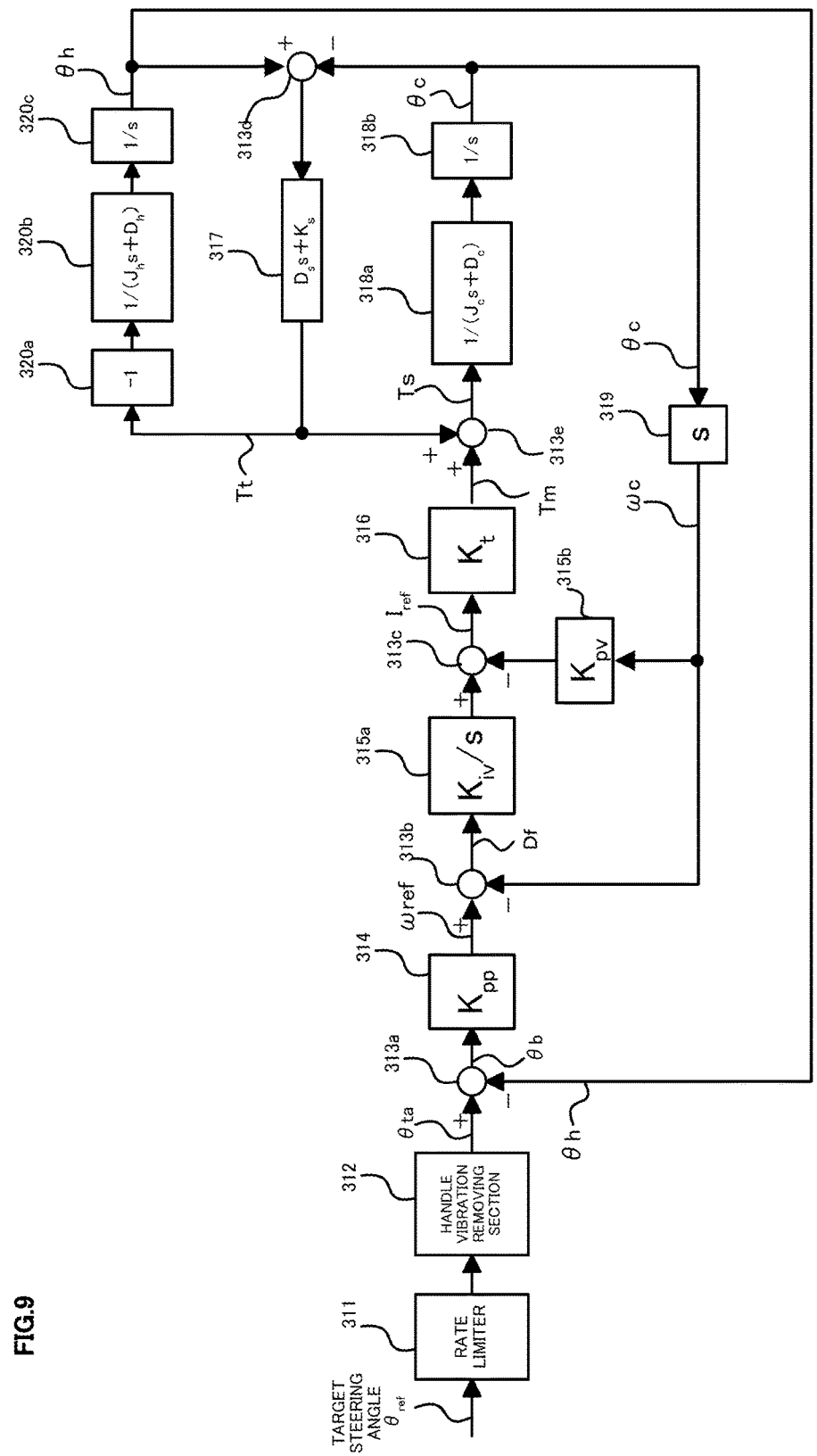
FIG. 9 is a block diagram showing the overall first embodiment (from a target steering angle to a handle steering angle) of the present invention.

By using the above physical quantity symbols, an overall block diagram from the target steering angle θ$_{ref}$ to the handle steering angle θh can be shown as a configuration of FIG. 9. The model will be described based on this configuration.

At first, the position control system that the velocity control loop system is the minor loop is formed. The target steering angle θ$_{ref}$ is inputted into the rate limiter 311 so that the target steering angle θ$_{ref}$ is smoothed, that is, the target steering angle θ$_{ref}$ is smoothly changed within a range of the predetermined time changing rate in a case that the target steering angle θ$_{ref}$ is suddenly changed. The target steering angle θ$_{ta}$ passing through the handle vibration removing section 312 that removes the vibration due to the spring characteristics of the torsion bar and the inertia moment of the handle (the vibration being caused by the spring inertia system) is addition-inputted into the subtracting section 313a.

The actual steering angle θh is subtraction-inputted into the subtracting section 313a. The angle deviation θb between the smoothed target steering angle θ$_{ta}$ and the actual steering angle θh is multiplied by the gain K$_{pp}$ at the position control section (K$_{pp}$) 314, and the motor velocity command value ωref that is the above multiplied value is addition-inputted into the subtracting section 313b. The motor angular velocity ωc from a differential section 319 is subtraction-inputted into the subtracting section 313b, and the calculated velocity deviation Df is passing through a integration section (the gain K$_{iv}$) 315a and is addition-inputted into the subtracting section 313c. The motor angular velocity ωc is multiplied by a gain K$_{pv}$ at the proportion section 315b, and is subtraction-inputted into the subtracting section 313c.

In the overall block diagram, the subtracted result at the subtracting section 313c is outputted to the motor torque converting section 316 as the current command value $I_{ref}$. The motor torque converting section 316 converts the current command value $I_{ref}$ into the motor torque Tm, and outputs the motor torque Tm to the adding section 313e. The torsion bar torque Tt that is generated from the torsion bar section 317 is addition-inputted into the adding section 313e, and is added to the motor torque Tm. The generated addition torque Ts is inputted into the column inertia section 318a, and an output of the column inertia section 318a is inputted into the integration section 318b. The column angle θc that is the output of the integration section 318b is inputted into the differential section 319 and the subtracting section 313d. The differential section 319 converts the inputted column angle θc into the column angular velocity ωc, and outputs the column angular velocity ωc to the proportion section (K$_{pv}$) 315b and the subtracting section 313b. The current command value $I_{ref}$ and the motor torque Tm are generated based on the column angular velocity ωc.

The torsion bar torque Tt that is generated from the torsion bar section 317 is outputted to the delay section 320a, and an output of the delay section 320a is inputted into the handle inertia section 320b. Subsequently, an output of the handle inertia section 320b is inputted into the integration section 320c, and the calculated result is generated as the handle steering angle θh. The handle steering angle θh generated from the integration section 320c is subtraction-inputted into the subtracting section 313a, and is used for generating the motor velocity command value ωref. The column angle θc outputted from the integration section 318b is subtraction-inputted into the subtracting section 313d, and the handle steering angle θh is addition-inputted into the subtracting section 313d. In the torsion bar section 317 of the overall block diagram, the torsion bar torque Tt is generated based on the difference between the column angle θc and the handle steering angle θh.

In this connection, in the overall block diagram as shown in FIG. 9, the transfer function $G_{\theta t}$ from the target steering angle $\theta_{ta}$ to the torsion bar torque Tt is represented as follows. Setting the target steering angle and the torsion bar torque as $\theta_{ta}$ [rad] and Tt [N·m], respectively, the transfer function $G_{\theta t}$ is represented by a below Expression 2.

$$G_{\theta t} = \frac{T_t}{\theta_{ta}} = G_{\theta i} G_{it} \quad \text{[Expression 2]}$$

"$G_{\theta i}$" and "$G_{it}$" in the Expression 2 are represented by an Expression 3 and an Expression 4, respectively.

$$G_{\theta i} = \frac{I_{ref}}{\theta_{ta}} = \frac{K_{pp} G_{\omega i}}{K_{pp} G_{\omega i} G_{ih} + 1} \quad \text{[Expression 3]}$$

$$G_{it} = \frac{T_t}{I_{ref}} = G_{ic} G_{ct} \quad \text{[Expression 4]}$$

"$G_{\omega i}$" and "$G_{ih}$" in the Expression 3 are represented by an Expression 5 and an Expression 6, respectively.

$$G_{\omega i} = \frac{I_{ref}}{\omega_{ref}} = \frac{\frac{K_{iv}}{s}}{(K_{pv} s + K_{iv}) G_{ic} + 1} \quad \text{[Expression 5]}$$

$$G_{ih} = -\frac{G_{it}}{J_h s^2 + D_h s} \quad \text{[Expression 6]}$$

"$G_{ic}$" in the Expression 4 is represented by an Expression 7.

$$G_{ic} = \frac{\theta_c}{I_{ref}} = \frac{K_t}{J_c s^2 + D_c s - G_{ct}} \quad \text{[Expression 7]}$$

Further, "$G_{ct}$" that is existed in the Expression 4 and the Expression 7 is represented by an Expression 8.

$$G_{ct} = \frac{T_t}{\theta_c} = -\frac{(D_2 s + K_s)(J_h s^2 + D_h s)}{J_h s^2 + (D_h + D_s) s + K_s} \quad \text{[Expression 8]}$$

Here, as described above, based on the model that is illustrated by the block diagram, as shown in FIG. 9, the frequency characteristics of the transfer function that the torsion bar torque is generated from the target steering angle are simulated in cases that the handle vibration removing section 212 is incorporated into the steering angle control section 200 and the handle vibration removing section 212 is not incorporated into the steering angle control section 200. Comparison results are shown in FIG. 10.

Figure 10:
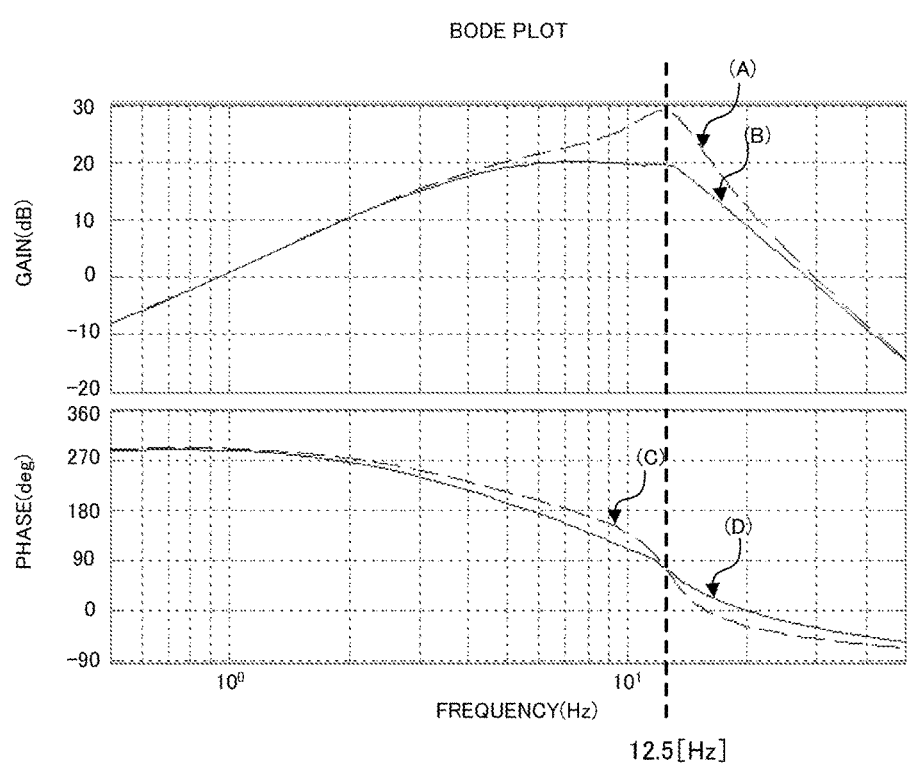
FIG. 10 is a characteristic diagram showing simulation results in cases that the handle vibration removing section is existed or is not existed.

In the simulation results of FIG. 10, in a case that the handle vibration removing section 212 is not incorporated into the steering angle control section 200, the gain and the phase of the frequency characteristics of the transfer function are shown by a dashed line (A) and a dashed line (C), respectively. In a case that the handle vibration removing section 212 is incorporated into the steering angle control section 200, the gain and the phase of the frequency characteristics of the transfer function are shown by a solid line (B) and a solid line (D), respectively. Compared with the above results, in a case that the handle vibration removing section 212 is incorporated into the steering angle control section 200, it is understood that the gain is reduced around the frequency about 12.5 [Hz], that is, the handle vibration due to the spring characteristics of the torsion bar and the inertia moment of the handle is removed.

Figure 11:
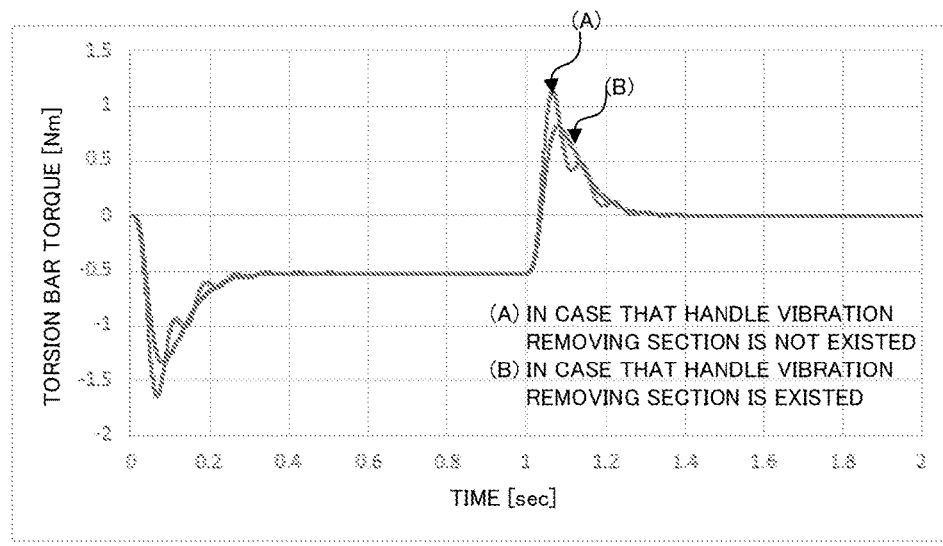
FIG. 11 is a simulation diagram showing time responses of a torsion bar torque in cases that the handle vibration removing section is existed or is not existed.

In order to explain an effect of the present invention, in cases that the handle vibration removing section 212 is existed and the handle vibration removing section 212 is not existed, time response waveforms of the torsion bar torque are shown in FIG. 11. As shown in FIG. 11, it is understood that the vibration that has a peak in a case that the handle vibration removing section 212 is existed is more restricted than the vibration in a case that the handle vibration removing section 212 is not existed.

Figure 12:
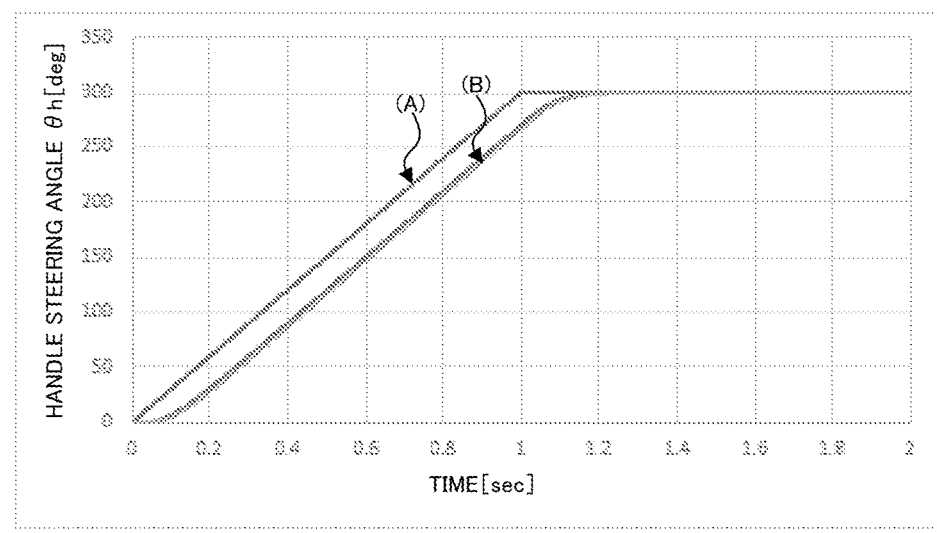
FIG. 12 is a simulation diagram showing time responses of a handle steering angle.

Further, FIG. 12 shows the time response of the handle steering angle θh when the target steering angle $\theta_{ref}$ is inputted into the steering angle control section 200. The waveform (A) of FIG. 12 shows a time variation of the target steering angle, and the waveform (B) does the time response of the handle steering angle θh when the target steering angle is inputted into the steering angle control section 200. The time response of the handle steering angle θh that follows-up the target steering angle in a case that the handle vibration removing section 212 is existed is almost the same as the time response of the handle steering angle θh in a case that the handle vibration removing section 212 is not existed, and the both lines almost overlaps. Thus, it is shown that the handle vibration removing section 212 does not influence the time response of the handle steering angle θh. Furthermore, it is understood that convergence of the vibration is improved.

Next, the second embodiment will be described with reference to the drawings. The difference between the first embodiment and the second embodiment is mainly explained.

The difference between the first embodiment and the second embodiment is provided with the handle damping section 216 in the steering angle control section 200 in order to restrict the handle vibration in operating by cutting off the predetermined frequency or less with reference to the torsion bar torque Tt. Accordingly, for convenience of explanation, the same elements that are used in the above first embodiment are designated with the same numerals or the same numerals having "X", and the explanation of the above elements is omitted.

Figure 13:
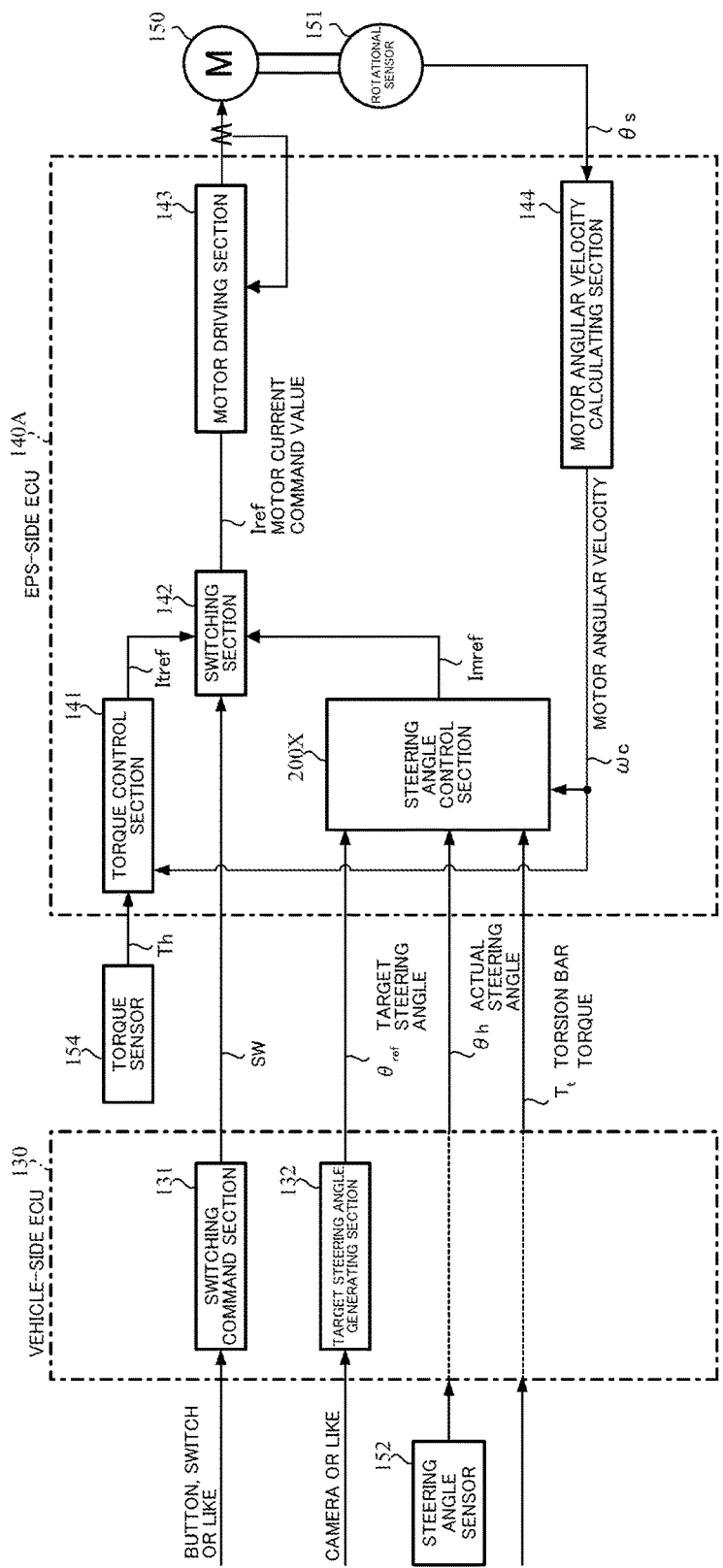
FIG. 13 is a block diagram showing a configuration example in the second embodiment of the present invention.
Figure 14:
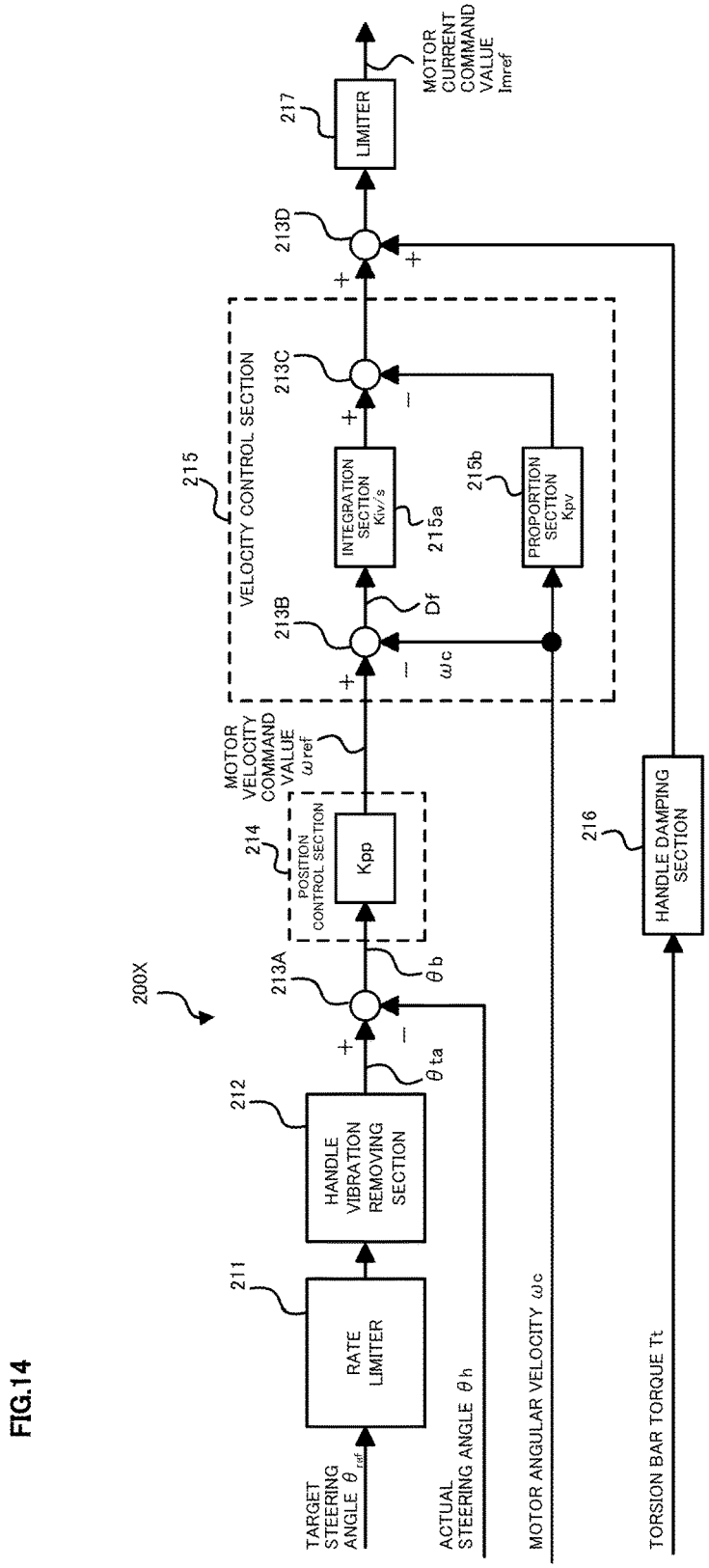
FIG. 14 is a block diagram showing a configuration example of a steering angle control section (the second embodiment) of the present invention.

FIG. 13 is a block diagram showing a configuration example of a control system of the electric power steering apparatus according to the second embodiment of the present invention. In FIG. 13, the difference between the first embodiment and the second embodiment will be described as follows. In this case, the EPS-side ECU 140A comprises the torque control section 141 that outputs the motor current command value Itref calculated based on the steering torque Th and the motor angular velocity ωc, and the steering angle control section 200X that calculates and outputs the motor current command value Imref for the steering angle automatic control based on the target steering angle $\theta_{ref}$, the actual steering angle θh, the motor angular velocity we and the torsion bar torque Tt. That is, the above configuration is added the configuration that the torsion bar torque Tt is inputted into the steering angle control section 200X to the configuration of the first embodiment (FIG. 4). FIG. 14 is a block diagram showing a configuration example of the steering angle control section 200X in the second embodiment of the present invention.

In FIG. 14, focusing the difference between the above first embodiment and the second embodiment, the explanation is performed. In this case, the handle damping section 216 in the steering angle control section 200X outputs a signal, which the frequency components with reference to the torsion bar torque Tt having the predetermined frequency or less are cut-offed, to the adding section 213D. Then, the output of the adding section 213D is inputted into the limiter 217. That is, in addition to the above configuration of the first embodiment (FIG. 5), there is provided a configuration that a signal outputted from the steering angle control section 200X is added to the output of the handle damping section 216 and the addition result is inputted into the limiter 217.

Figure 15:
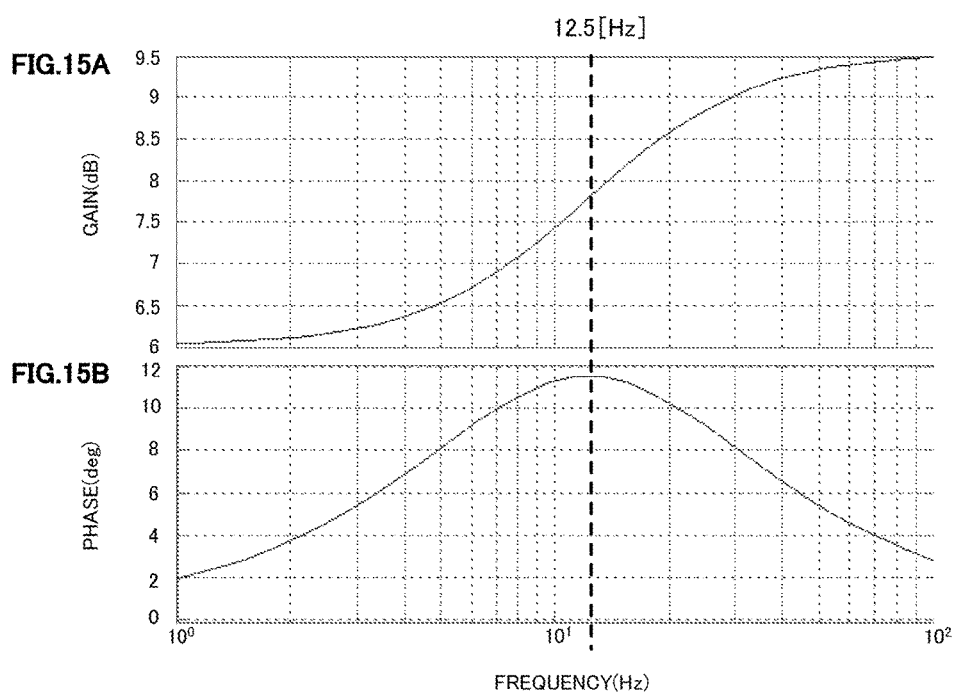
FIG. 15A and FIG. 15B are characteristic diagrams showing a frequency characteristic example of a handle damping section.

Or else, the handle damping section 216 is disposed in the steering angle control section 200X in order to restrict the handle vibration in operating. FIG. 15A is a characteristic diagram showing the frequency characteristic of the gain of the handle damping section 216, and FIG. 15B is a characteristic diagram showing the frequency characteristic of the phase of the handle damping section 216. The handle damping section 216, as shown in the characteristic diagrams of FIG. 15A and FIG. 15B, is a high pass filter (HPF), attenuates the cut-off frequency 12.5 [Hz] or less, and performs a phase advance compensation (first order). The cut-off frequency of the high pass filter is set based on the handle vibration frequency due to the spring characteristics of the torsion bar and the inertia moment of the handle. For example, it is set in a range of "12.5±5 [Hz]".

Figure 16:
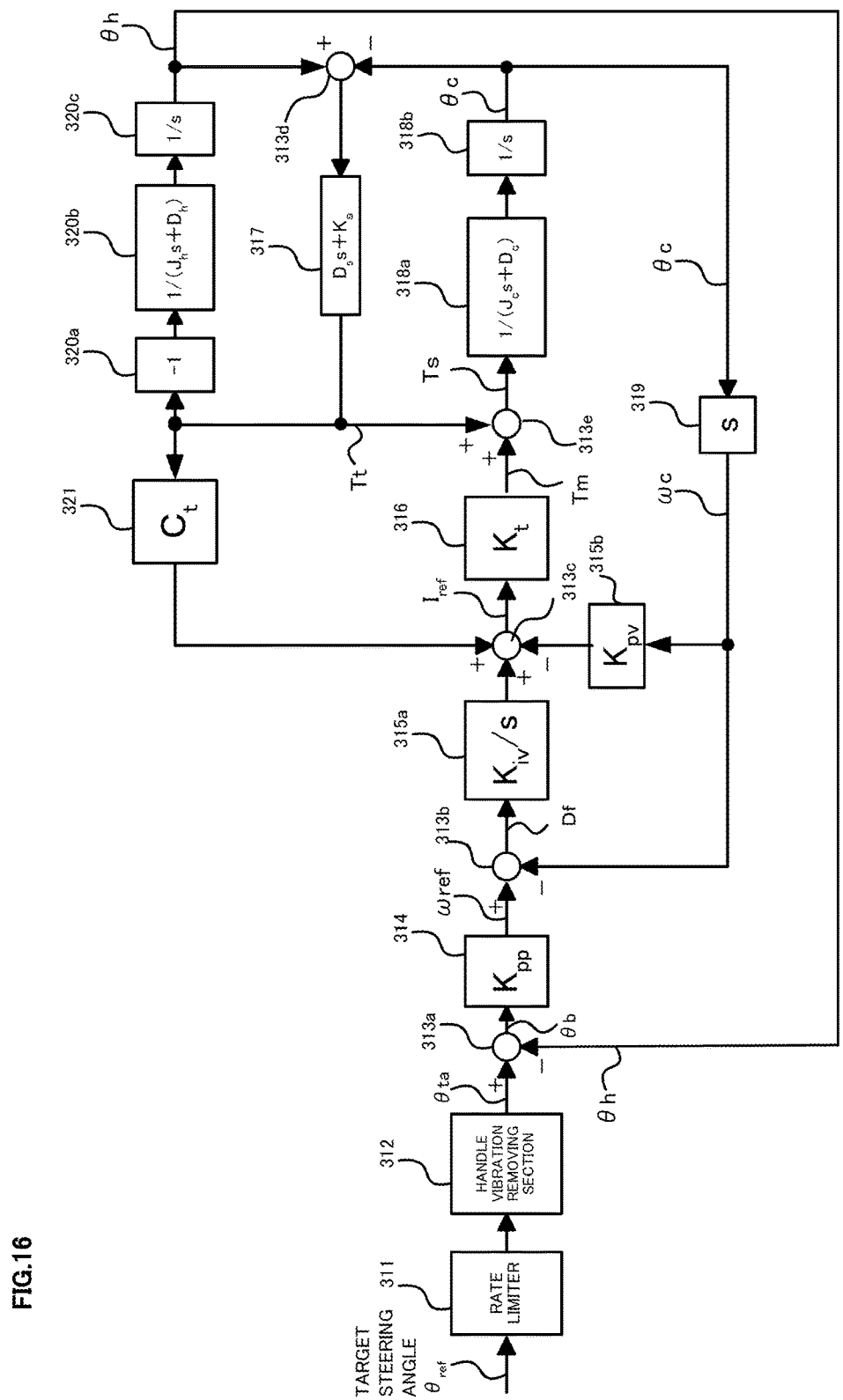
FIG. 16 is a block diagram showing the second embodiment of the present invention.

In also the second embodiment in similar to the first embodiment, the overall block diagram from the target steering angle $\theta_{ref}$ to the handle steering angle θh, can be shown as the configuration of FIG. 16. The model will be described based on this configuration.

In FIG. 16, focusing the difference between the above first embodiment and the second embodiment, the explanation is performed. In this case, this configuration comprises the configuration of the first embodiment (FIG. 9) and a proportion gain section 321 that the torsion bar torque Tt is multiplied by the gain Ct and the multiplied result is addition-inputted into the subtracting section 313c.

Figure 17:
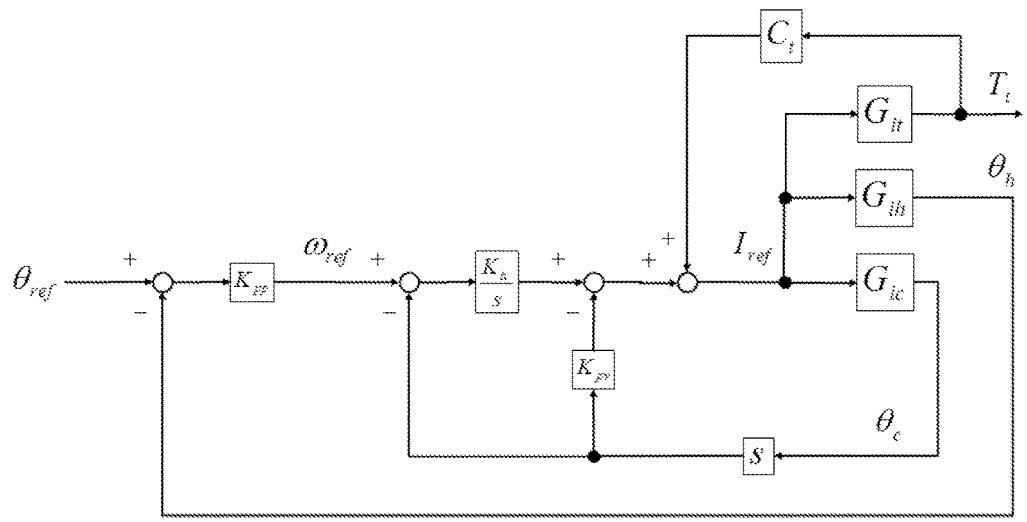
FIG. 17 is a block diagram showing the overall example that the second embodiment (from the target steering angle to the handle steering angle) of the present invention is equivalent-transformed.
Figure 18:
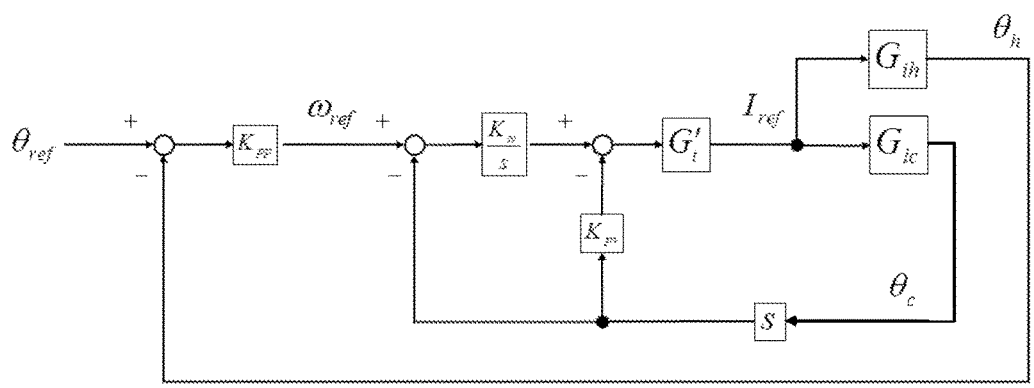
FIG. 18 is a block diagram showing the overall example that the second embodiment (from the target steering angle to the handle steering angle) of the present invention is equivalent-transformed.

Performing equivalent transformation against the overall block diagram from the target steering angle $\theta_{ref}$ to the handle steering angle θh as shown in FIG. 16, the block diagram shown in FIG. 17 is obtained. Further, performing the equivalent transformation against the block diagram shown in FIG. 17, the block diagram shown in FIG. 18 is obtained. Here, the rate limiter, the output limiter and the handle vibration removing means are omitted.

In the overall block diagram as shown in FIG. 16, setting the target steering angle and the torsion bar torque as $\theta_{ta}$ [rad] and $T_t$ [N·m], respectively, the transfer function $G_{\theta t}$ from the target steering angle $\theta_{ta}$ to the torsion bar torque $T_t$ is represented by the above Expression 2. "$G_{\theta i}$" and "$G_{it}$" in the Expression 2 are represented by the above Expressions 3 and 4, respectively.

In the second embodiment, "$G_{ih}$" and "$G_{\omega i}$" in the above Expression 3 are represented by a below Expressions 9 and 10, respectively.

$$G_{ih} = -\frac{G_{it}}{J_h s^2 + D_h s}$$ [Expression 9]

$$G_{\omega i} = \frac{I_{ref}}{\omega_{ref}} = \frac{\frac{K_{iv}}{s} G_t'}{(K_{pv} s + K_{iv}) G_t' G_{ic} + 1}$$ [Expression 10]

Further, "$G_t'$" in the Expression 10 is represented by an Expression 11.

$$G_t' = \frac{1}{1 - C_t G_{it}}$$ [Expression 11]

Furthermore, "$G_{ct}$" and "$G_{ic}$" in the Expression 4 are represented by below Expressions 12 and 13, respectively.

$$G_{ct} = \frac{T_t}{\theta_c} = -\frac{(D_2 s + K_s)(J_h s^2 + D_h s)}{J_h s^2 + (D_h + D_s)s + K_s}$$ [Expression 12]

$$G_{ic} = \frac{\theta_c}{I_{ref}} = \frac{K_t}{J_c s^2 + D_c s - G_{ct}}$$ [Expression 13]

Figure 19:
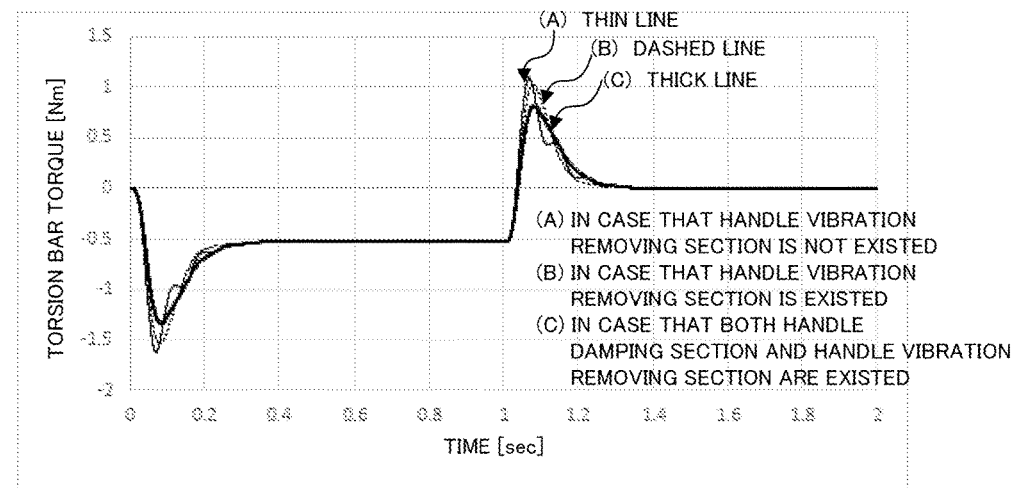
FIG. 19 is a simulation result showing time responses of the handle steering angle in cases that the handle damping section and the handle vibration removing section are existed or are not existed.
Figure 20:
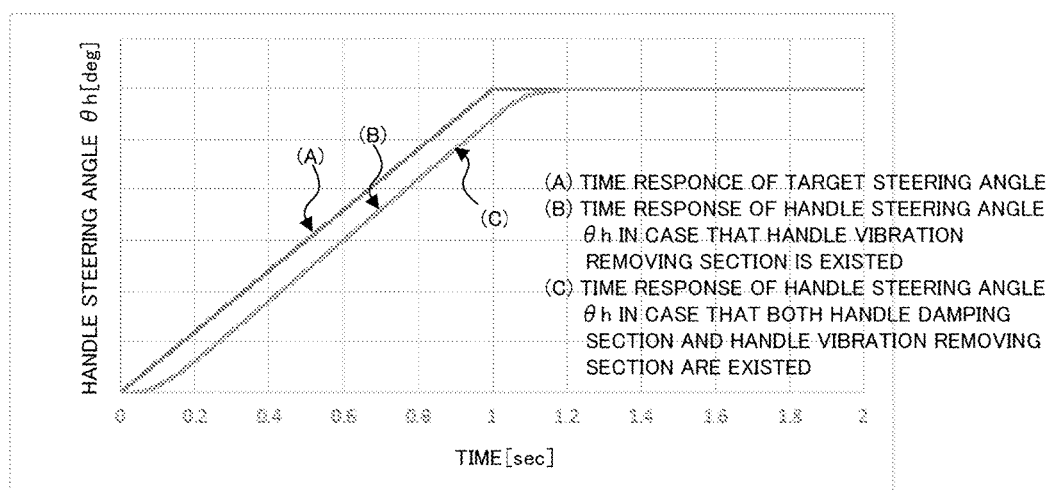
FIG. 20 is a simulation result showing time responses of the handle steering angle in cases that the handle damping section and the handle vibration removing section are existed or are not existed.
Figure 21:
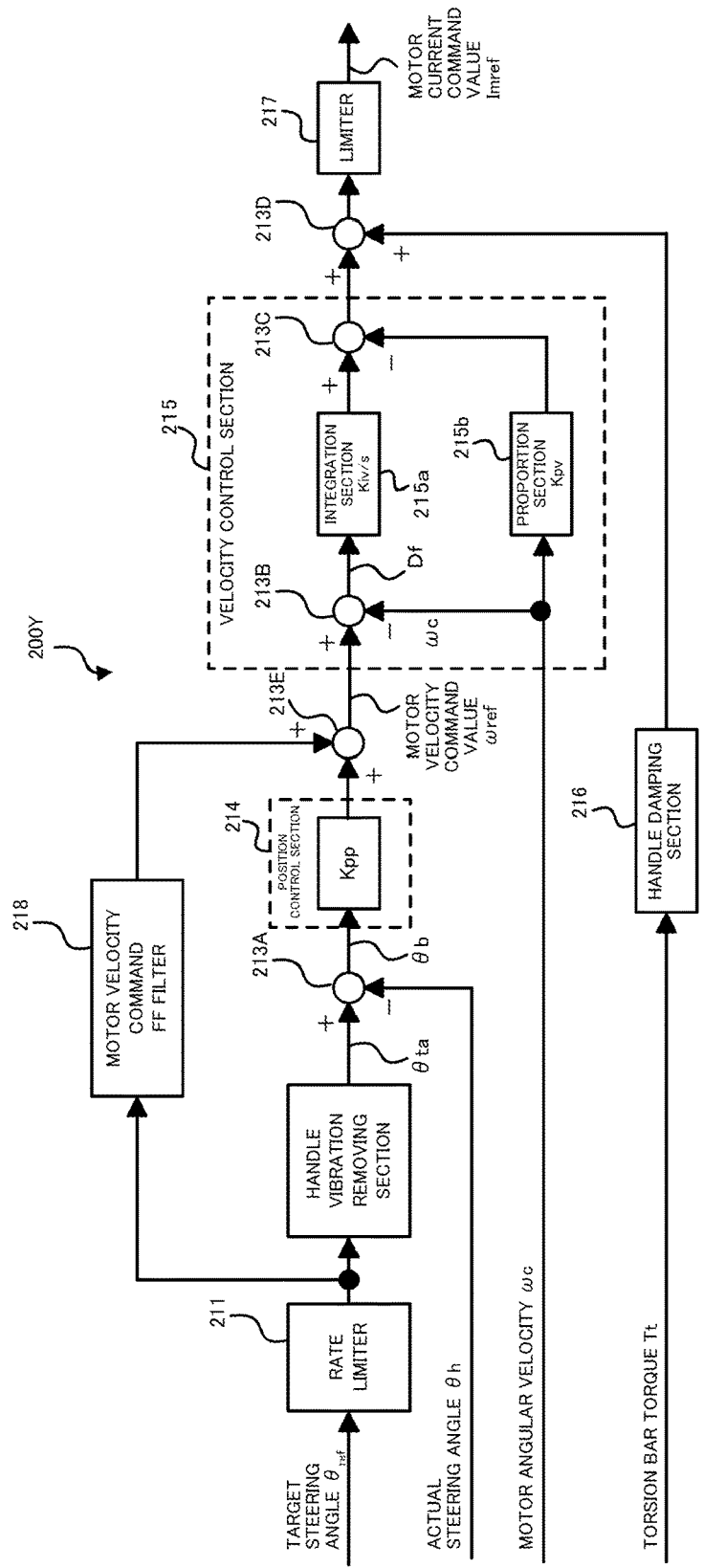
FIG. 21 is a block diagram showing the third embodiment of the present invention.

Here, the effect of the second embodiment of the present invention will be described by using FIG. 19. The waveform (A) of FIG. FIG. 19 (thin line) shows the time response of the handle steering angle θh to the target steering angle in a case that compensation of the handle damping section and the handle vibration removing section are not existed. The waveform (B) (dashed line) shows the time response of the handle steering angle θh to the target steering angle in a case that only the handle vibration removing section is existed. The waveform (C) (thick line) shows the time response of the handle steering angle θh to the target steering angle in a case that both the handle damping section and the handle vibration removing section are existed. According to the simulation results shown in FIG. 20, since the damping effect in a case that both the handle damping section and the handle vibration removing section are existed is the largest, it is expected that the effect that restricts the handle vibration in operating is exerted. The torsion bar torque when the steering angle response of FIG. 21 is performed is shown in FIG. 20. The convergence of the vibration is further improved.

The difference between the above second embodiment and the third embodiment is that a motor velocity command FF (feed-forward) filter 218 is disposed in the steering angle control section 200Y in order that the control band of the actual angle to the target steering angle (after of the rate limiter) is spread to the high frequency side. Accordingly, for convenience of explanation, the same elements that are used in the first embodiment and the second embodiment are designated with the same numerals or the same numerals having "Y", and the explanation of the above elements is omitted.

FIG. 21 is a block diagram showing a configuration example of the steering angle control section 200Y according to the third embodiment of the present invention.

In FIG. 21, focusing the difference between the above second embodiment and the third embodiment, the explanation is performed. In this case, the motor velocity command FF filter 218 in the steering angle control section 200Y inputs the output of the rate limiter 211 and performs the feed-forward (FF) process. Then, the output of the motor velocity command FF filter 218 is addition-inputted into the adding section 213E. The motor velocity command FF filter 218 is disposed in the steering angle control section 200Y in order to improve the response of the steering angle control by spreading the control band of the actual angle against the target steering angle to the high frequency side.

Figure 22:
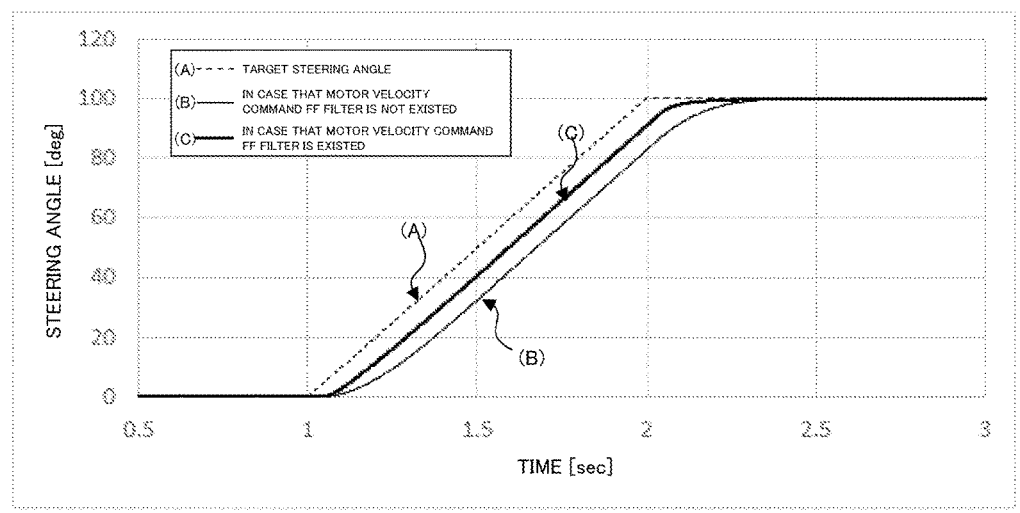
FIG. 22 is a simulation result showing time responses of the actual steering angle in the third embodiment of the present invention.

Next, the motor velocity command FF filter will be described by using FIG. 22 that shows the simulation results. In FIG. 22, the waveform (A) shows the time variation of the target steering angle, the waveform (B) does the time response of the actual steering angle in a case that the motor velocity command FF filter is not existed, and the waveform (C) shows the time response of the actual steering angle in a case that the motor velocity command FF filter is existed. As shown in FIG. 22, it is understood that the following-up of the steering angle control in a case that the motor velocity command FF filter is existed is more improved than the following-up in a case that the motor velocity command FF filter is not existed. The third embodiment is effectively used to the abrupt lane change because the following-up of the actual steering angle to the target steering angle is improved and the response of the vehicle motion control is improved.

Figure 23:
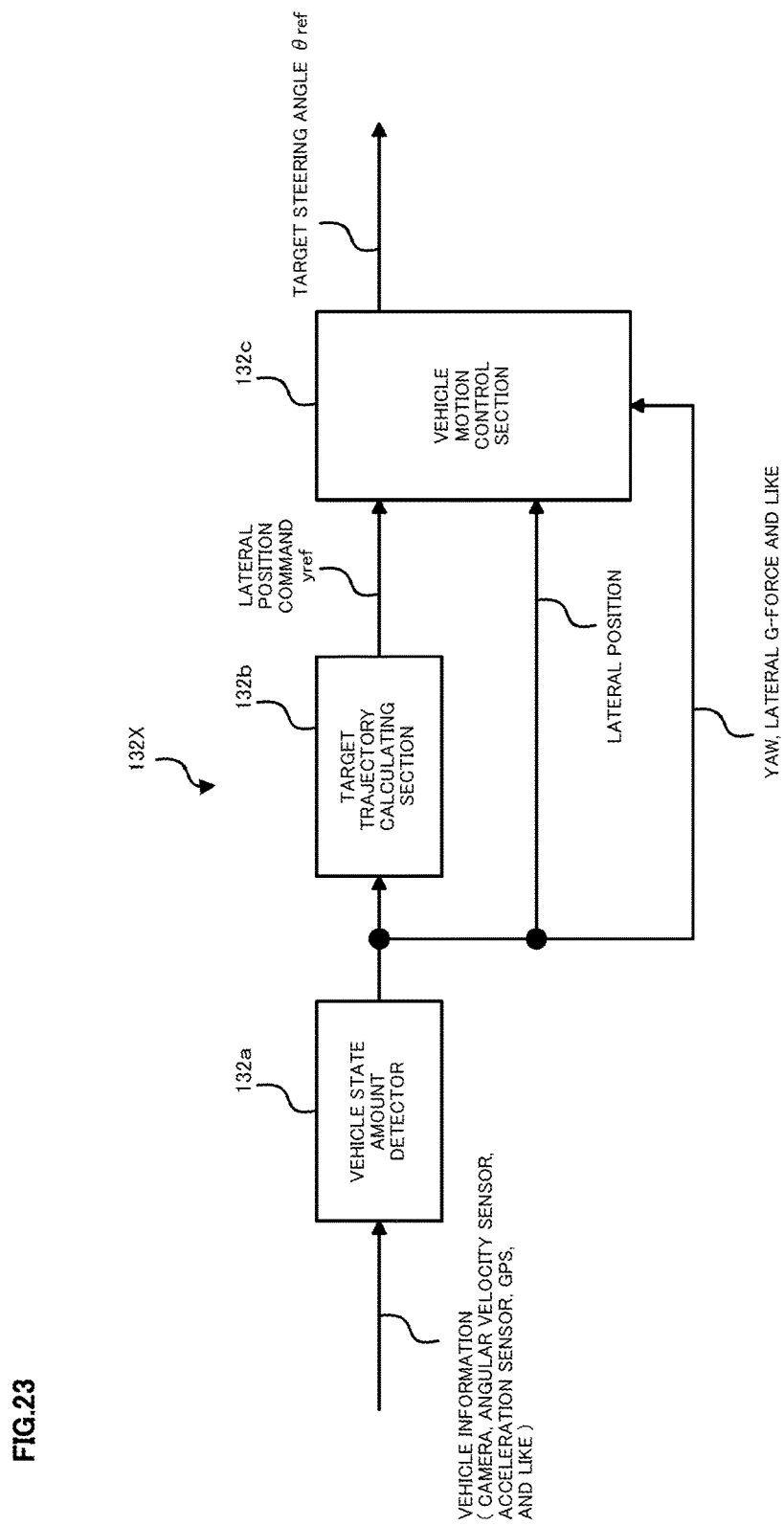
FIG. 23 is a block diagram showing a target steering angle generating section in the fourth embodiment of the present invention.

Hereinafter, the difference between the fourth embodiment and the first embodiment through the third embodiment will be described with reference to the drawings. FIG. 23 is a block diagram showing the target steering angle generating section 132X of the control system of the electric power steering apparatus according to the fourth embodiment of the present invention.

The difference between the fourth embodiment and the first embodiment through the third embodiment is that the target steering angle generating section 132X is disposed in the steering angle section 200Y, which is described below, in order to stabilize behavior of a vehicle lateral position. The target steering angle generating section 132X calculates the lateral position and a lateral position command yref based on the vehicle information (for example, a camera, an angular velocity sensor, an acceleration sensor, global positioning system (GPS) and the like), and the target steering angle θref based on the lateral position and the lateral position command yref.

Next, the target steering angle generating section 132X according to the fourth embodiment will be described. The target steering angle generating section 132X comprises a vehicle state amount detector 132a, a target trajectory calculating section 132b and a vehicle motion control section 132c. The vehicle state amount detector 132a calculates the lateral positon, the yaw, the lateral g-force and the like based on the vehicle information (the camera, the angular velocity sensor, the acceleration sensor, the GPS and the like). The target trajectory calculating section 132b calculates the lateral position command based on the calculating results of the vehicle state amount detector 132a. The vehicle motion control section 132c calculates the target steering angle θref based on the lateral positon command yref, the lateral position Y [m], the yaw, the lateral g-force and the like. The lateral position Y [m] is calculated by the image data of the camera and the like, and the position information of the GPS. The relative distance of the vehicle to the lane is fed back to the vehicle motion control section 132c. The vehicle motion control section 132c has an indispensable function when the vehicle changes the lane in running an almost straight road. This function is also used when the vehicle changes the lane in running a gentle curve.

Figure 24:
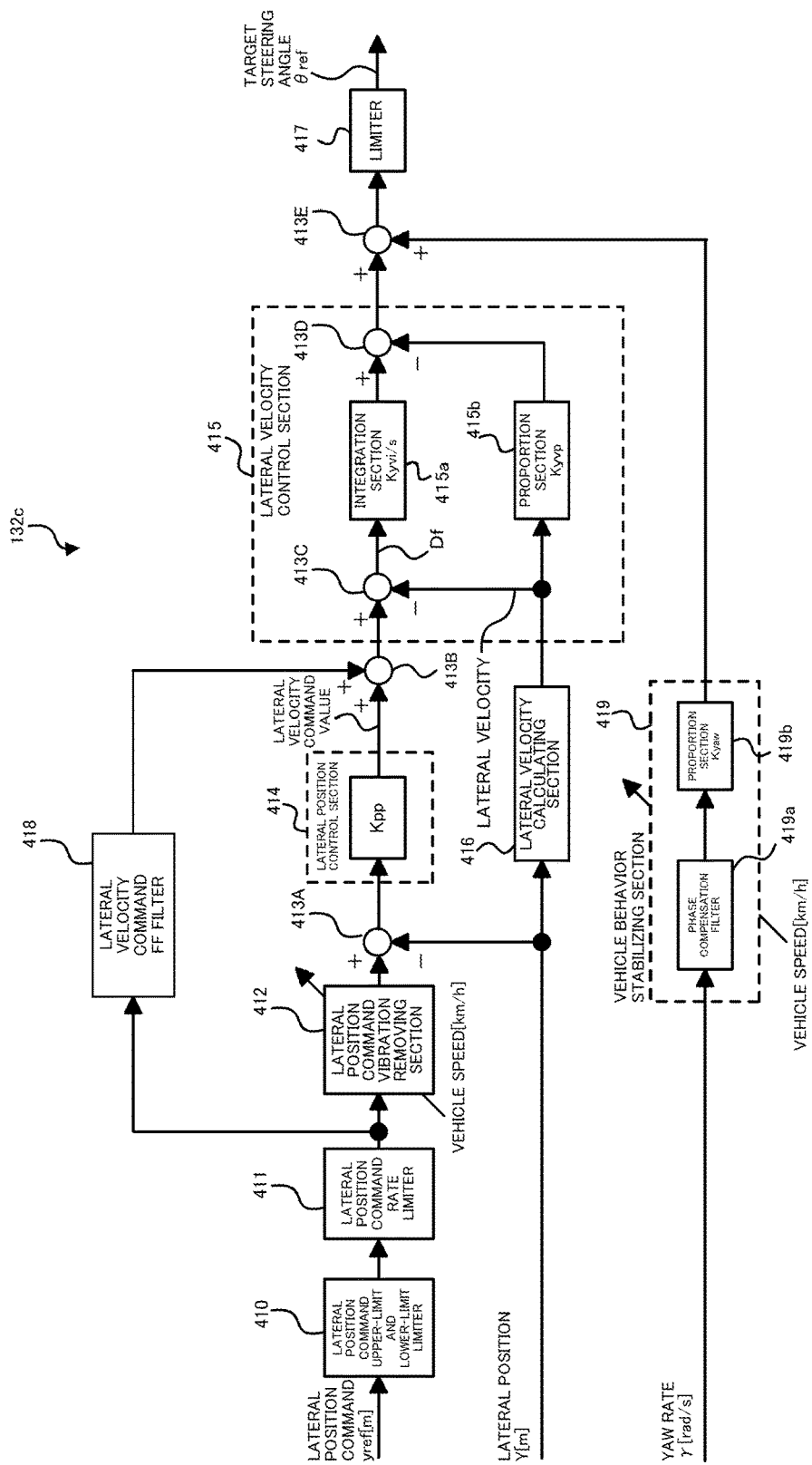
FIG. 24 is a block diagram showing a configuration example of a vehicle motion control section in the fourth embodiment of the present invention.

FIG. 24 is a block diagram showing a configuration example of the vehicle motion control section 132c according to the fourth embodiment of the present invention. The lateral position command yref [m], the lateral position Y[m], the yaw rate γ[rad/s] are inputted into the vehicle motion control section 132c. A lateral position command upper-limit and lower-limit limiter 410 into which the lateral position command yref [m] is inputted, and a lateral position command rate limiter 411 into which the output of the lateral position command upper-limit and lower-limit limiter 410 is inputted, are disposed. Further, a lateral position command vibration removing section 412 and a lateral velocity command FF filter into which the output of the lateral position command rate limiter 411 is inputted are disposed. The output of the lateral position command vibration removing section 412 is addition-inputted into the subtracting section 413A. The output of the lateral velocity command FF filter 418 is adding-inputted into the adding section 413B. The subtracting section 413A is corresponding to the subtracting section 213A of the second embodiment.

The yaw rate γ[rad/s] is inputted into a vehicle behavior stabilizing section 419, and the output of the vehicle behavior stabilizing section 419 is addition-inputted into the adding section 413E. The adding section 413E is corresponding to the adding section 213D of the second embodiment. The lateral position Y[m] is inputted into a lateral velocity calculating section 416 and is subtraction-inputted into the subtracting section 413A. The subtracting section 413A is corresponding to the subtracting section 213A of the second embodiment. Even in a case of replacing the yaw rate γ[rad/s] with the lateral g-force, the same control configuration is achieved, and the similar vehicle behavior stabilization can be realized. (As well, the vehicle behavior stabilization is not completely coincident.) The direction of the yaw rate γ[rad/s] and the lateral g-force is defined as follows. When the actual steering angle is positively inputted (steadily), the yaw rate γ[rad/s] and the lateral g-force have a positive value.

Next, the functions of the respective elements of the vehicle motion control section 132c will be described.

The lateral position command upper-limit and lower-limit limiter 410 limits the upper limit and the lower limit of the lateral position command yref. Thereby, in a case that an abnormal value is occurred due to the communication failure, the memory failure or the like, the abnormal value can be limited by the lateral position command upper-limit and lower-limit limiter 410.

The lateral position command rate limiter 411 performs the rate limit process against the lateral position command yref in order to avoid a sudden variation of the target steering angle θref, which is the output of the vehicle motion control section 132c, due to the sudden variation of the lateral position command yref. This process is also related to the improvement of the safety to the driver.

In a case that the vibration phenomena due to the resonance characteristics (the yaw resonance or the like) of the vehicle in controlling the vehicle are occurred, the lateral position command vibration removing section 412 performs the phase delay compensation and the notch filter process or the low pass filter process in order to reduce the vibration frequency components included in the lateral position command yref after the rate limit process. Since it is generally known that the frequency and the gain in the yaw resonance of the vehicle are varied depending on the vehicle speed, the frequency characteristics may be varied depending on the vehicle speed.

The lateral position control section 414 multiplies the deviation between the lateral position command value being the output of the lateral position command vibration removing section 412 and the lateral position by the proportion gain Kpp, and calculates the lateral velocity command value due to the lateral position control section 414.

The lateral velocity control section 415 (an I-P controller) inputs the lateral velocity command value and the lateral velocity, and calculates the target steering angle (an output value of the lateral velocity control section) so that the lateral velocity follows-up the lateral velocity command value.

The lateral velocity calculating section 416 may be the calculation equivalent to the differentiation of the detected lateral position Y. In order to implement the lateral velocity calculating section 416, the difference, the low pass filter for removing the high frequency noise and the gain can be used. As the low pass filter, for example, it is used that the filter may be a first-order form and may have the cut-off frequency that is set between 10 Hz and 30 Hz. Or it can be used that the calculation may be performed by using pseudo differential utilizing the high pass filter, and the gain. In a case that the high pass filter is used, the high pass filter may be the first-order form and may have the cut-off frequency being set between 10 [Hz] and 30 [Hz].

The target steering angle output limiter 417 limits the target steering angle by using the output limiter in order to prevent from outputting the excessive value of the target steering angle.

In order to improve the following-up characteristic of the lateral position to the lateral position command yref, the lateral velocity command FF filter 418 adds, the value being obtained by filtering the lateral position command yref after the lateral position command rate limiter 411 and multiplying the filtered value with the gain, to the lateral velocity command value being the output of the lateral position control section 414. The filter that is the phase lead filter, the high pass filter or a filter that leads the phase of the lateral position command yref by using the differential filter or the like, may be used in the lateral velocity command FF filter 418. Further, the filter characteristic and the gain may be changeable depending on the vehicle speed. In the abrupt steering, the following-up can be improved by setting the larger gain than the gain in the normal steering.

The damping effect against the vibration phenomena of the vehicle can further be improved by the vehicle behavior stabilizing section 419 based on the yaw rate signal γ[rad/s] of the vehicle. The vehicle behavior stabilizing section 419 comprises a phase compensation filter 419a and a proportion section (a gain Kyaw) 419b. The phase compensation filter 419a may be the first-order filter or the second-order filter. If the phase compensation filter 419a has a phase characteristic that the vehicle behavior can be stabilized, the phase compensation filter 419a may be the low pass filter, the high pass filter, the notch filter or a band pass filter (BPF). The phase compensation filter 419a may vary the frequency characteristic depending on the vehicle speed. In this case, for example, the phase compensation that a gain map and the cut-off frequency to the vehicle speed are changeable may be used. The gain coefficient Kyaw of the proportion section 419b may be set the positive value or the negative value.

Figure 25:
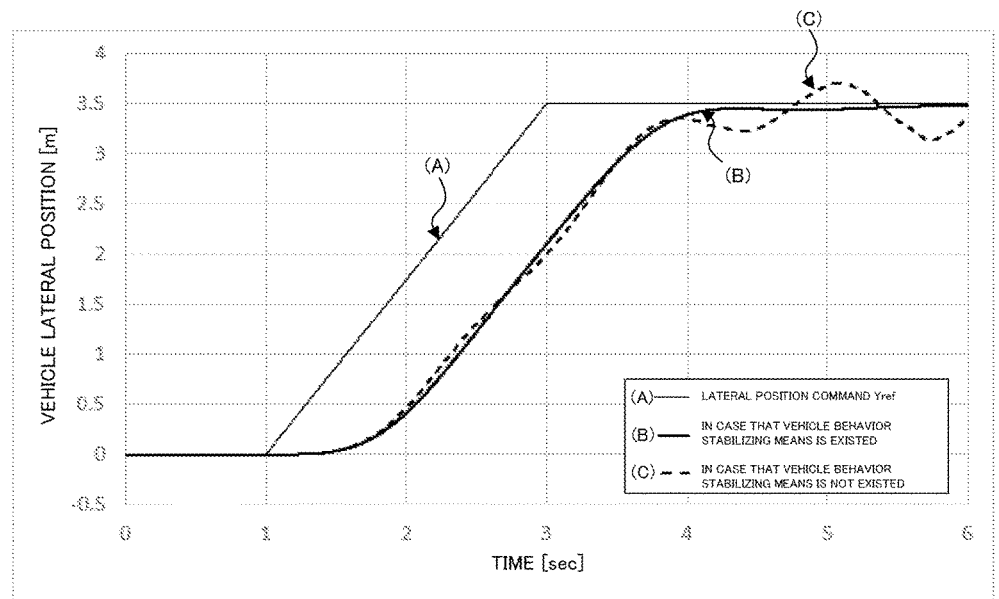
FIG. 25 is a simulation result showing time responses of a vehicle lateral position in the fourth embodiment of the present invention.
Figure 26:
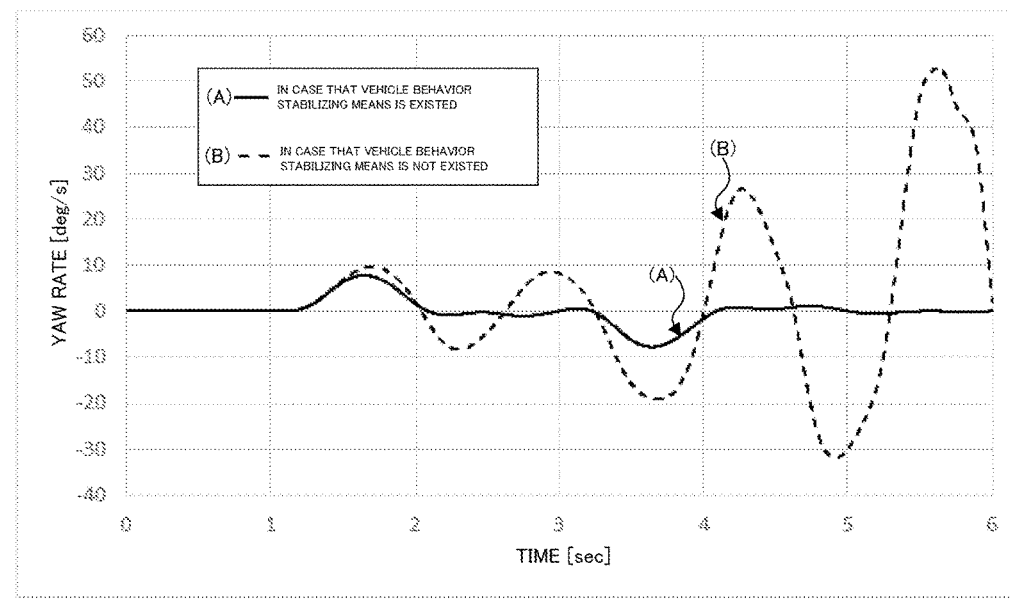
FIG. 26 is a simulation result of a response time of a yaw rate in FIG. 25.

Next, the effect of the vehicle motion control section 132c is explained by showing the time response of the yaw rate by means of the simulation in FIG. 25 and FIG. 26.

The results that perform the time response simulation of the vehicle lateral position are shown in FIG. 25. In FIG. 25, the waveform (A) shows the time variation of the lateral position command yref, the waveform (B) does the time response of the vehicle lateral position in a case that the vehicle behavior stabilizing means is existed, and the waveform (C) does the time response of the vehicle lateral position in a case that the vehicle behavior is not existed.

It is understood from FIG. 25 that the vehicle lateral position is stabilized without vibrating by being provided the vehicle behavior stabilizing means with the vehicle motion control section, and the vehicle lateral position is not stabilized and is vibrated in a case that the vehicle behavior stabilizing means is not provided with the vehicle motion control section. In this simulation, the phase compensation filter of the vehicle behavior stabilizing means is a first-order form low pass filter, and the cut-off frequency is set to 0.5 [Hz].

FIG. 26 shows the time variation of the yaw rate in the simulation of FIG. 25, the waveform (A) is the time response of the yaw rate in a case that the vehicle behavior stabilizing means is existed, and the waveform (B) is the time response of the yaw rate in a case that the vehicle behavior stabilizing means is not existed. In this simulation result, as shown in FIG. 26, it is understood that the yaw rate in a case that the vehicle behavior stabilizing means is existed is less vibrated and more stabilized than the yaw rate in a case that the vehicle behavior stabilizing means is not existed.

EXPLANATION OF REFERENCE NUMERALS 2 column shaft (handle shaft)
20 motor
23 torsion bar
100 control unit (ECU)
130 vehicle-side ECU
131 switching command section
132, 132X target steering angle generating section
132a vehicle state amount detector
132b target trajectory calculating section
132c vehicle motion control section
140, 140A EPS-side ECU
141 torque control section
142 switching section
143 motor driving section
150 motor
200, 200X, 200Y steering angle control section
211, 311 rate limiter
212, 312 handle vibration removing section
214 position control section
215 velocity control section
215a, 315a, 318b, 320c, 415a integration section
215b, 314, 315b, 415b, 419b proportion section
216 handle damping section
218 motor velocity command FF filter
316 motor torque converting section (Kt)
317 torsion bar section
318a column inertia section
319 differential section (s)
320a delay section
320b handle inertia section
410 lateral position command upper-limit and lower-limit limiter
411 lateral position command rate limiter
412 lateral position command vibration removing section
414 lateral position control section
415 lateral velocity control section
416 lateral velocity calculating means
418 lateral velocity command FF filter
419 vehicle behavior stabilizing means
419a phase compensation filter

The invention claimed is:

1. An electric power steering apparatus that has an assist mode which controls a motor applying an assist torque to a steering system of a vehicle when steering said steering system and an automatic mode which controls said motor depending on a target steering angle supplied from said vehicle as needed when said vehicle autonomously runs, the electronic power steering apparatus comprising:

an electronic control unit configured to control the electronic power steering apparatus, the electronic control unit comprising;

a torque control section to calculate a first motor current command value based on a vehicle speed of said vehicle and a steering torque inputted into a steering shaft of said steering system;

a steering angle control section to calculate a second motor current command value based on said target steering angle, an actual steering angle and a motor angular velocity of said motor; and a vehicle motion control section to calculate said target steering angle based on vehicle information, wherein said vehicle motion control section comprises:

a rate limiter whose output value is coincident with a lateral position command by changing said output value in a step form with reference to said lateral position command in a predetermined period;

a lateral position command vibration removing section to remove vibration frequency components of an output of said rate limiter;

a lateral velocity calculating section to calculate a lateral velocity based on a lateral position;

a lateral position control section to input a difference between said lateral position and an output value of said lateral position command vibration removing section, and to output a lateral velocity command value;

a lateral velocity control section that comprises an integration section to integrate a deviation between said lateral velocity command value and said lateral velocity; and a proportion section to input said lateral velocity, and outputs a subtracted value by subtracting an output of said proportion section from an output of said integration section; and a vehicle behavior stabilizing section to input a yaw rate signal and to pass said yaw rate signal whose frequency having a predetermined cut-off frequency or more, wherein said vehicle motion control section adds an output of said vehicle behavior stabilizing section to an output of said lateral velocity control section, and sets as said target steering angle.

2. The electric power steering apparatus according to claim 1, wherein said steering angle control section further comprises a lateral velocity command feed-forward filter to input said output of said rate limiter, to perform a feed-forward process and to output a processed value, and wherein said lateral position control section includes a first proportion section, inputs said difference into said first proportion section, adds an output of said lateral velocity command feed-forward filter to an output of said first proportion section, and outputs as said lateral velocity command value.

3. The electric power steering apparatus according to claim 1, wherein said vehicle information is said lateral position command, said lateral position and said yaw rate signal.

4. The electric power steering apparatus according to claim 2, wherein said vehicle information is said lateral position command, said lateral position and said yaw rate signal.

5. The electric power steering apparatus according to claim 1, wherein said vehicle behavior stabilizing section comprises a phase compensation filter and a second proportion section, and said phase compensation filter is a first-order filter or a second-order filter.

6. The electric power steering apparatus according to claim 2, wherein said vehicle behavior stabilizing section comprises a phase compensation filter and a second proportion section, and said phase compensation filter is a first-order filter or a second-order filter.

7. The electric power steering apparatus according to claim 3, wherein said vehicle behavior stabilizing section comprises a phase compensation filter and a second proportion section, and said phase compensation filter is a first-order filter or a second-order filter.

8. The electric power steering apparatus according to claim 5, wherein said phase compensation filter is a first-order low pass filter, and a cut-off frequency of said low pass filter is set to 0.5 [Hz].

* * * * *